United States Patent
Lisnyak et al.

(10) Patent No.: US 11,525,537 B2
(45) Date of Patent: Dec. 13, 2022

(54) PIPE CRAWLER

(71) Applicants: Gennadiy Lisnyak, Richmond Hill (CA); Valeriy Guyvoronskiy, Toronto (CA)

(72) Inventors: Gennadiy Lisnyak, Richmond Hill (CA); Valeriy Guyvoronskiy, Toronto (CA)

(*) Notice: Subject to any disclaimer, the term of this patent is extended or adjusted under 35 U.S.C. 154(b) by 0 days.

(21) Appl. No.: 16/963,656

(22) PCT Filed: Jan. 23, 2019

(86) PCT No.: PCT/CA2019/050083
§ 371 (c)(1),
(2) Date: Jul. 21, 2020

(87) PCT Pub. No.: WO2019/144227
PCT Pub. Date: Aug. 1, 2019

(65) Prior Publication Data
US 2021/0071801 A1 Mar. 11, 2021

Related U.S. Application Data

(60) Provisional application No. 62/774,758, filed on Dec. 3, 2018, provisional application No. 62/620,910, filed on Jan. 23, 2018.

(51) Int. Cl.
*G01N 21/952* (2006.01)
*G01N 23/02* (2006.01)
*G01N 27/83* (2006.01)
(Continued)

(52) U.S. Cl.
CPC ............ *F16L 55/18* (2013.01); *G01N 21/952* (2013.01); *G01N 23/02* (2013.01); *G01N 27/83* (2013.01);
(Continued)

(58) Field of Classification Search
CPC ...... G01N 27/83; G01N 23/02; G01N 21/952; G01N 29/265; G01N 27/9093; G01N 2291/2634; G01N 2223/628; F16L 55/18
(Continued)

(56) References Cited

U.S. PATENT DOCUMENTS 7,182,025 B2 * 2/2007 Ghorbel .................. F16L 55/26
104/139
8,646,347 B2 2/2014 Dubbeldam et al.
(Continued)

FOREIGN PATENT DOCUMENTS

CN  104972460 A  10/2015
CN  105598096 A  5/2016
(Continued)

OTHER PUBLICATIONS

International Application No. PCT/CA2019050083, "Written Opinion of the International Searching Authority", pp. 1-5.

*Primary Examiner* — Jacques M Saint Surin
(74) *Attorney, Agent, or Firm* — Kunzler Bean & Adamson; Bruce R. Needham

(57) ABSTRACT

An apparatus includes a pipe crawler (100). The pipe crawler (100) includes one or more drive wheels (308) capable of moving along and around a pipe, and one or more instruments coupled to the one or more drive wheels (308). An instrument includes one or more of a sensor instrument and a maintenance instrument. The pipe crawler (100) includes a retention mechanism (4) that retains the one or more drive wheels (308) against an outer surface of the pipe. The retention mechanism (104) provides adjustable positions for the one or more drive wheels (308) for disposing the one or more drive wheels (308) against the outer surface of the pipe. The apparatus includes a controller (302) that communicates with the one or more drive wheels (308) to
(Continued)

move the one or more drive wheels (308) on the outer surface of the pipe, and that operates the one or more instruments.

19 Claims, 24 Drawing Sheets

(51) Int. Cl.
    *G01N 27/9093*     (2021.01)
    *G01N 29/265*     (2006.01)
    *F16L 55/18*     (2006.01)

(52) U.S. Cl.
    CPC ....... *G01N 27/9093* (2013.01); *G01N 29/265* (2013.01); *G01N 2223/628* (2013.01); *G01N 2291/2634* (2013.01)

(58) Field of Classification Search
    USPC ........................................................ 73/865.8
    See application file for complete search history.

(56) References Cited

U.S. PATENT DOCUMENTS

| | | |
|---|---|---|
| 9,470,658 B2 | 10/2016 | Troy et al. |
| 11,220,356 B2 * | 1/2022 | Troy .......................... B64F 5/60 |
| 2016/0266049 A1 | 9/2016 | Carlson et al. |
| 2017/0090484 A1 | 3/2017 | Obaidi |
| 2018/0281119 A1 * | 10/2018 | Lagerkvist ......... B23K 37/0282 |

FOREIGN PATENT DOCUMENTS

| | | | |
|---|---|---|---|
| CN | 206012760 U | 3/2017 | |
| CN | 106594455 A | 4/2017 | |
| CN | 107064297 A | 8/2017 | |
| CN | 107433989 A | 12/2017 | |
| EP | 1442278 | * 10/2004 | .............. F16L 55/38 |
| EP | 3359329 A1 | * 8/2018 | ......... B23K 37/0531 |
| KR | 20130135208 | * 10/2013 | .............. B25J 13/08 |

\* cited by examiner

PIPE CRAWLER

SUMMARY

An apparatus includes a pipe crawler. The pipe crawler includes one or more drive wheels capable of moving along and around a pipe, and one or more instruments coupled to the one or more drive wheels. An instrument includes one or more of a sensor instrument and a maintenance instrument. The Apparatus includes a retention mechanism that retains the one or more drive wheels against an outer surface of the pipe. The retention mechanism provides adjustable positions for the one or more drive wheels for disposing the one or more drive wheels against the outer surface of the pipe. The apparatus includes a controller that communicates with the one or more drive wheels to move the one or more drive wheels on the outer surface of the pipe, and that operates the one or more instruments.

In some embodiments, the pipe crawler includes an obstacle sensor that detects obstacles along the pipe and communicates with the controller. The controller controls the drive wheels to avoid the obstacles. In other embodiments, at least one of the one or more drive wheels includes an omni wheel and/or a mecanum wheel. In other embodiments, the one or more drive wheels include a first omni wheel oriented for moving the pipe crawler along the pipe and a second omni wheel oriented for moving the pipe crawler around the pipe. In other embodiments, the one or more drive wheels include a pair of mecanum wheels that corotate to move the pipe crawler in a first direction and that counterrotate to move the pipe crawler in a second direction.

In some embodiments, the apparatus includes a feeder tube that encloses the pipe crawler for delivering the pipe crawler to the pipe. The retention mechanism deforms in the feeder tube such that the pipe crawler is retained in the feeder tube in a linear shape prior to emerging from the feeder tube. In other embodiments, the length of the pipe crawler is less than a full circumference of the pipe and the retention mechanism retains the pipe crawler in an open ring shape on the outer surface of the pipe. In other embodiments, the retention mechanism includes a set of couplings that connect adjacent drive wheels. The couplings applying a spring force and/or a motor force to retain the drive wheels against the outer surface of the pipe. In other embodiments, the retention mechanism includes a solid open ring and rods coupled to the drive wheels. The rods extend through openings in a body of the open ring and the rods are movable within the openings for moving the drive wheels to contact the outer surface of the pipe. The rods move within the openings for contacting a plurality of pipe contours.

In some embodiments, the apparatus includes one or more brackets that extend from the pipe crawler to flexibly connect the pipe crawler to one or more of a second pipe crawler and a cable support. In other embodiments, the pipe crawler also includes a cable and a plurality of cable supports. The cable is coupled to the controller and a cable support includes a connector that couples the cable to the cable support. The connector is slidably coupled to the pipe to allow the cable support to move along the pipe. In other embodiments, the pipe crawler includes a battery, a light source, a radio transmitter, a radio receiver, a cable connection port, a power switch, and/or one or more motors that operate the one or more drive wheels. In other embodiments, the sensor instrument inspects a condition of the pipe. In further embodiments, the sensor instrument includes a camera, a video camera, an x-ray sensor, a pipe thickness sensor, an ultrasound sensor, an eddy current sensor, and/or a magnetic sensor.

In some embodiments, wherein the maintenance instrument performs operations affecting a condition of the pipe. In other embodiments, the maintenance instrument includes a welder, a cutter, a grinder, a wire brush, a machining tool, an ultrasonic impact hardener and/or an applicator for one or more of a protective coating and thermal insulation. In other embodiments, the apparatus includes a drone for delivering the pipe crawler to the pipe. In other embodiments, wherein the retention mechanism includes a plurality of servos that position the one or more drive wheels against the outer surface of the pipe. In other embodiments, the retention mechanism includes a linear actuator that controls positioning of the one or more drive wheels.

A pipe crawler includes one or more drive wheels capable of moving along and around a pipe, where at least one of the one or more drive wheels comprises one or more of an omni wheel and a mecanum wheel and one or more instruments coupled to the one or more drive wheels. An instrument includes a sensor instrument and/or a maintenance instrument and the sensor instrument inspects a condition of the pipe. The pipe crawler includes a retention mechanism that retains the one or more drive wheels against an outer surface of the pipe. The retention mechanism provides adjustable positions for the one or more drive wheels for disposing the one or more drive wheels against the outer surface of the pipe. The retention mechanism includes a set of couplings that connect adjacent drive wheels and/or a solid open ring and rods coupled to the drive wheels. The couplings applying a spring force and/or a motor force to retain the drive wheels against the outer surface of the pipe. The rods extend through openings in a body of the open ring and the rods are movable within the openings for moving the drive wheels to contact the outer surface of the pipe. The rods move within the openings for contacting a plurality of pipe contours. The pipe crawler includes a controller that communicates with the one or more drive wheels to move the one or more drive wheels on the outer surface of the pipe and that operates the one or more instruments. The pipe crawler includes an obstacle sensor that detects obstacles along the pipe and communicates with the controller, where the controller controls the drive wheels to avoid the obstacles. The length of the pipe crawler is less than a full circumference of the pipe and the retention mechanism retains the pipe crawler in an open ring shape on the outer surface of the pipe.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
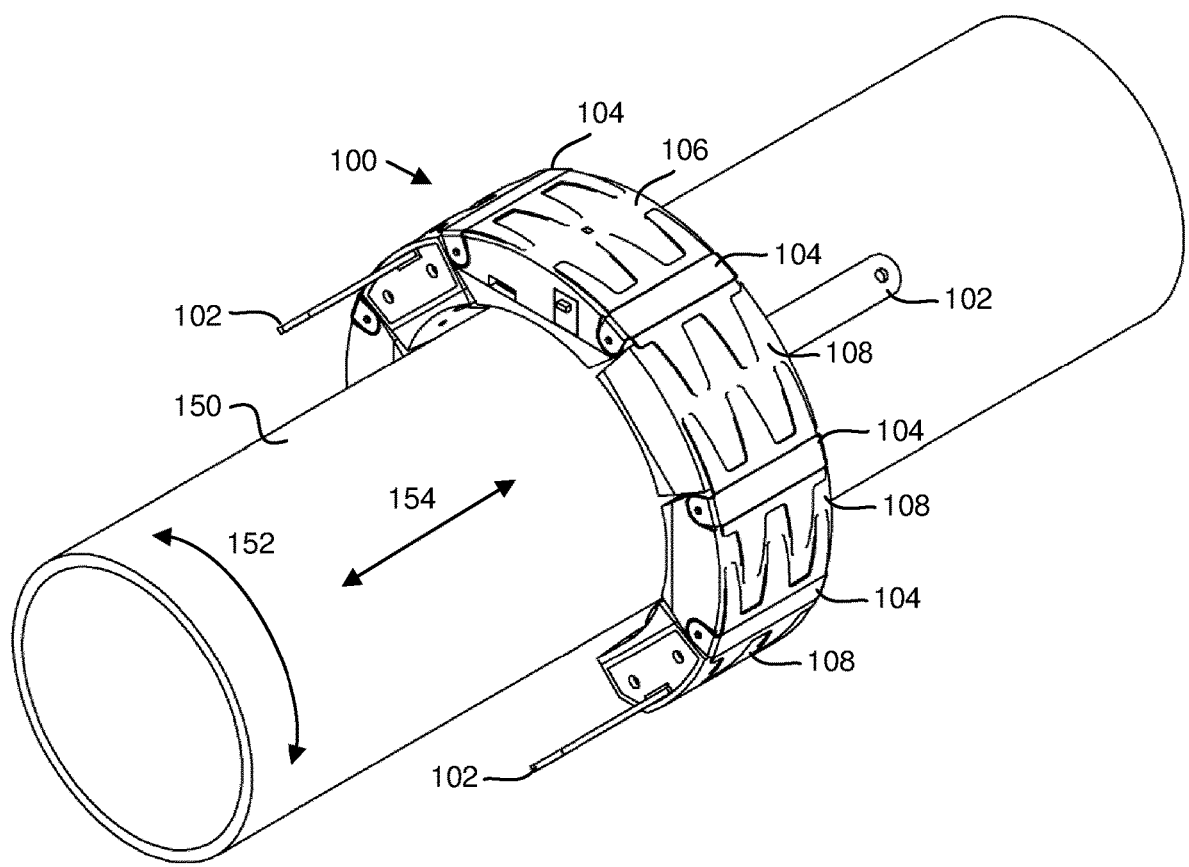
FIG. 1 is a perspective view illustrating one embodiment of a pipe crawler on a pipe.

FIG. 1 depicts one embodiment of a pipe crawler 100 on a pipe 150. In general, in various embodiments, a pipe crawler 100 may travel along and/or around a pipe 150 to inspect and/or maintain the pipe 150. In further embodiments, a pipe crawler 100 may perform operations for pipe construction or dismantlement. In various embodiments, the pipe 150 may be any pipe that is constructed, dismantled, inspected, or maintained, such as part of an outdoor pipeline, an indoor industrial pipe, part of an array of pipes, or the like. In the depicted embodiment, the pipe crawler 100 is an apparatus that includes a plurality of linearly coupled segments 106, 108. In one embodiment, the plurality of segments includes one or more drive segments 108 and one or more instrument segments 106. In a further embodiment, the pipe crawler includes a retention mechanism 104, a controller (not shown in FIG. 1) and one or more brackets 102.

In various embodiments, a segment 106, 108 may refer to a discrete portion of a pipe crawler 100, and may include an instrument or mechanism for performing part of the function of the pipe crawler. In some embodiments, one segment 106, 108 of a pipe crawler 100 may be individually modified, repaired, or replaced without modifying other segments 106, 108. In some embodiments, pipe crawlers 100 for performing various functions may be assembled from various modular or interchangeable segments 106, 108.

In the depicted embodiment, the plurality of segments 106, 108 are linearly coupled. In various embodiments, "linearly coupled" may refer to segments 106, 108 coupled in sequence, one after the other, without implying a rigidly linear shape. Thus, for example, in the depicted embodiment, the linearly coupled segments 106, 108 form an arcuate shape matching the outer surface of the pipe 150. In another embodiment, the segments 106, 108 may form another shape but still be linearly coupled.

In one embodiment, the length of the plurality of linearly coupled segments 106, 108 is greater than half the circumference of a pipe 150. In some embodiments, a plurality of segments 106, 108 with a length greater than half the circumference of the pipe 150 may allow the pipe crawler 100 to move around the circumference of the pipe 150 without falling off.

In one embodiment, the plurality of segments 106, 108 includes one or more drive segments 108. In some embodiments, a drive segment 108 may include a drive mechanism for moving the pipe crawler 100. One or more drive segments 108, in a further embodiment, may be capable of moving the plurality of segments 106, 108 along the pipe 150, around the pipe 150, or simultaneously along and around the pipe 150. A drive mechanism may include a drive wheel, which may be a wheel driven by a motor, a hydraulic drive, or the like (e.g., either directly driven by a motor shaft or indirectly driven or via a belt, gear, or other power transmission components), and may include a rubber wheel, a metal wheel, an omni wheel, a mecanum wheel, or the like.

In various embodiments, motion "around" the pipe 150 may refer to motion in a direction 152 around the circumference of the pipe, and motion "along" the pipe 150 may refer to motion in a direction 154 along the length of the pipe 150. For example, in one embodiment, one drive segment 108 may include a drive mechanism for moving the pipe crawler 100 around the pipe 150, and another drive segment 108 may include a drive mechanism for moving the pipe crawler 100 along the pipe 150. In another embodiment, one drive segment 108 may include a drive mechanism capable of moving the pipe crawler 100 both around and along the pipe 150. In some embodiments, multiple drive segments 108 may include similar or identical drive mechanisms, so that the pipe crawler 100 is moved by the multiple drive segments 108 at the same time. Moving the pipe crawler 100 with multiple drive segments 108 at the same time may, in some embodiments, distribute the force for moving the pipe crawler 100 across multiple regions of the pipe crawler 100, thus avoiding strain on one particular region or drive segment 108. Moving the pipe crawler 100 with multiple drive segments 108 may also reduce the power requirements of the individual drive segments 108.

In a further embodiment, the plurality of segments 106, 108 includes one or more instrument segments 106. In general, in various embodiments, an instrument segment 106 includes an instrument that facilitates pipe inspection, repair, maintenance, construction, destruction, or the like. Thus, in some embodiments, an instrument segment 106 may include a sensor instrument and/or a maintenance instrument. In one embodiment, an instrument segment 106 may include one or multiple sensor instruments and/or maintenance instruments. In another embodiment, a pipe crawler 100 may include multiple instrument segments 106 for multiple sensor instruments and/or maintenance instruments.

In one embodiment, the instrument segment 106 may include a sensor instrument that inspects the condition of the pipe 150. For example, in various embodiments, a sensor instrument may include (without limitation) a camera, a video camera, an x-ray sensor, a pipe thickness sensor, an ultrasound sensor, an eddy current sensor, and/or a magnetic sensor. In one embodiment the sensor instrument may sense corrosion, leaks, weld strength, pipe thickness, a defect, or any other condition relating to the pipe 150. In another embodiment, a sensor instrument may detect conditions external to the pipe 150, such as temperature, or the location of obstacles for the pipe crawler 100 to avoid. In view of this disclosure, many sensor instruments that may be included in an instrument segment 106 of a pipe crawler 100 are clear.

In one embodiment, the instrument segment 106 may include a maintenance instrument that performs operations affecting the condition of the pipe. For example, in various embodiments, a maintenance instrument may include (without limitation) a welder, a cutter, a grinder, a wire brush, a machining tool, an ultrasonic impact hardener and/or an applicator for a protective coating and/or thermal insulation. In one embodiment, a maintenance instrument may perform operations for maintaining the pipe, such as cleaning corrosion or dirt from the pipe, repairing leaks, applying a protective coating, or the like. In another embodiment, a maintenance instrument may perform operations for building or dismantling the pipe, such as welding segments together or cutting segments apart. In view of this disclosure, many maintenance instruments that may be included in an instrument segment 106 of a pipe crawler 100 are clear.

In some embodiments, a pipe crawler 100 may include one or more drive segments 108, and/or one or more drive wheels disposed in a non-segmented manner. In some embodiments, a pipe crawler 100 may include one or more instrument segments 106, and/or one or more non-segmented instruments. In various embodiments, a pipe crawler 100 may include segments 106, 108, drive wheels, and/or instruments that are linearly and/or non-linearly coupled. For example, in one embodiment, a drive wheel may be linearly coupled to other drive wheels around the pipe 150 (e.g., coupled in sequence in an arcuate shape around the pipe 150), but may also be coupled to an instrument via a coupling that branches off from the sequence of drive wheels. As a further example, in some embodiments, an instrument may be a camera for pipe inspection, and the camera may be linearly coupled in sequence between drive wheels, or may be coupled out of sequence, such as to the outer surface of a drive segment 108.

In the depicted embodiment, the pipe crawler 100 includes a retention mechanism 104. In general, in various embodiments, a retention mechanism 104 retains the segments 106, 108 in a shape matching the outer surface of the pipe 150. In one embodiment, a retention mechanism 104 may retain the drive segments 108, drive mechanisms, and/or drive wheels against the outer surface of the pipe 150. For example, in the depicted embodiment, the length of the plurality of segments 106, 108 or of the pipe crawler 100 is less than a full circumference of the pipe 150, and the retention mechanism 104 retains the segments 106, 108 and/or the pipe crawler 100 in an open ring shape on the outer surface of the pipe 150. An open ring shaped pipe crawler 100, with a length less than the full circumference of the pipe 150 may avoid obstacles while moving along a pipe 150 by moving around the pipe 150 to dispose the obstacle in the gap of the open ring. Obstacle avoidance is described in further detail below with regard to FIGS. 7 and 8.

In one embodiment, the retention mechanism 104 may include a set of couplings that connect adjacent segments 106, 108, and/or a set of couplings that connect adjacent drive wheels. In some embodiments, the couplings may apply a spring force and/or a motor force to retain the segments 106, 108 in the shape matching the outer surface of the pipe 150, or to retain the drive wheels against the outer surface of the pipe 150. For example, in the depicted embodiment, the retention mechanism 104 includes a set of springs that apply a spring force that retains the segments 106, 108 against the pipe 150. In another embodiment, a motor force may be applied via hydraulic fluid, pushrods, or the like, or may be applied directly by an electric motor or another type of motor. In a further embodiment, the retention mechanism 104 may include a set of motor-driven, articulated couplings that connect adjacent segments, and a controller for the pipe crawler 100 may control the motor-driven couplings to apply a motor force that retains the segments 106, 108 against the pipe 150. Motorized couplings, in some embodiments, may further be controlled to move the plurality of segments into another shape (e.g., for avoiding obstacles along the pipe 150). For example, in one embodiment, a motorized coupling may allow a segment to move in several different directions relative to an adjacent segment, and multiple motorized couplings may allow the pipe crawler 100 to crawl around or over various obstacles in a snake-like manner.

In another embodiment, the retention mechanism 104 may be other than a set of couplings. For example, another type of retention mechanism is described below with regard to FIGS. 4-6.

In some embodiments, the retention mechanism 104 provides adjustable positions for the segments 106, 108. In further embodiments, adjustable positions for the segments 106, 108 may facilitate disposing the plurality of segments 106, 108 on the outer surface of the pipe. For example, in the depicted embodiment, a user may flex the springs in the retention mechanism 104 backward, adjusting the position of the segments 106, 108 outward to increase the size of the gap in the open ring. Adjusting the position of the segments 106, 108 outward may accommodate a larger pipe 150, or may allow a pipe to pass through the gap in the open ring, so that the pipe crawler 100 may be disposed around the outer surface of the pipe 150, or may allow the segments 106, 108 to avoid an obstacle.

In some embodiments, a retention mechanism 104 may provide adjustable positions for the drive segments 108, drive mechanisms, and/or drive wheels for disposing the drive segments 108, drive mechanisms, and/or drive wheels against the outer surface of the pipe 150. In various embodiments, retaining at least a plurality of drive wheels against the outer surface of the pipe 150 may facilitate motion of the pipe crawler 100 (e.g., by driving the drive wheels), and may retain the pipe crawler 100 on the pipe 150 so that it doesn't fall off. In further embodiments a retention mechanism 104 may retain instrument segments 106 and/or instruments against the pipe 150, or may retain the drive segments 108, drive mechanisms, and/or drive wheels against the pipe 150 while instruments are disposed further away from the pipe 150. For example, in one embodiment, an instrument may be a video camera configured to focus on the pipe 150 one foot away from the video camera, and the retention mechanism 104 may retain drive segments 108, drive mechanisms, and/or drive wheels against the pipe 150 while the camera remains disposed a foot away from the pipe 150.

In one embodiment, a controller (not shown in FIG. 1) communicates with the one or more drive segments 108, drive mechanisms, and/or drive wheels, to move the one or more drive segments 108, drive mechanisms, and/or drive wheels on the outer surface of the pipe 150. In a further embodiment, the controller operates the one or more instrument segments 106 and/or instruments on the pipe 150. The operation of the controller is described further below with regard to FIG. 3.

In one embodiment, the pipe crawler 100 includes one or more brackets 102. Although brackets 102 are shown in the depicted embodiment, another embodiment of a pipe crawler 100 may not include brackets 102. In a further embodiment, a pipe crawler 100 may include removable brackets 102. In general, brackets 102 may extend from the pipe crawler 100 to flexibly connect the pipe crawler 100 to another pipe crawler, a cable support, or another object. Brackets are described further below with regard to FIG. 16.

Figure 2:
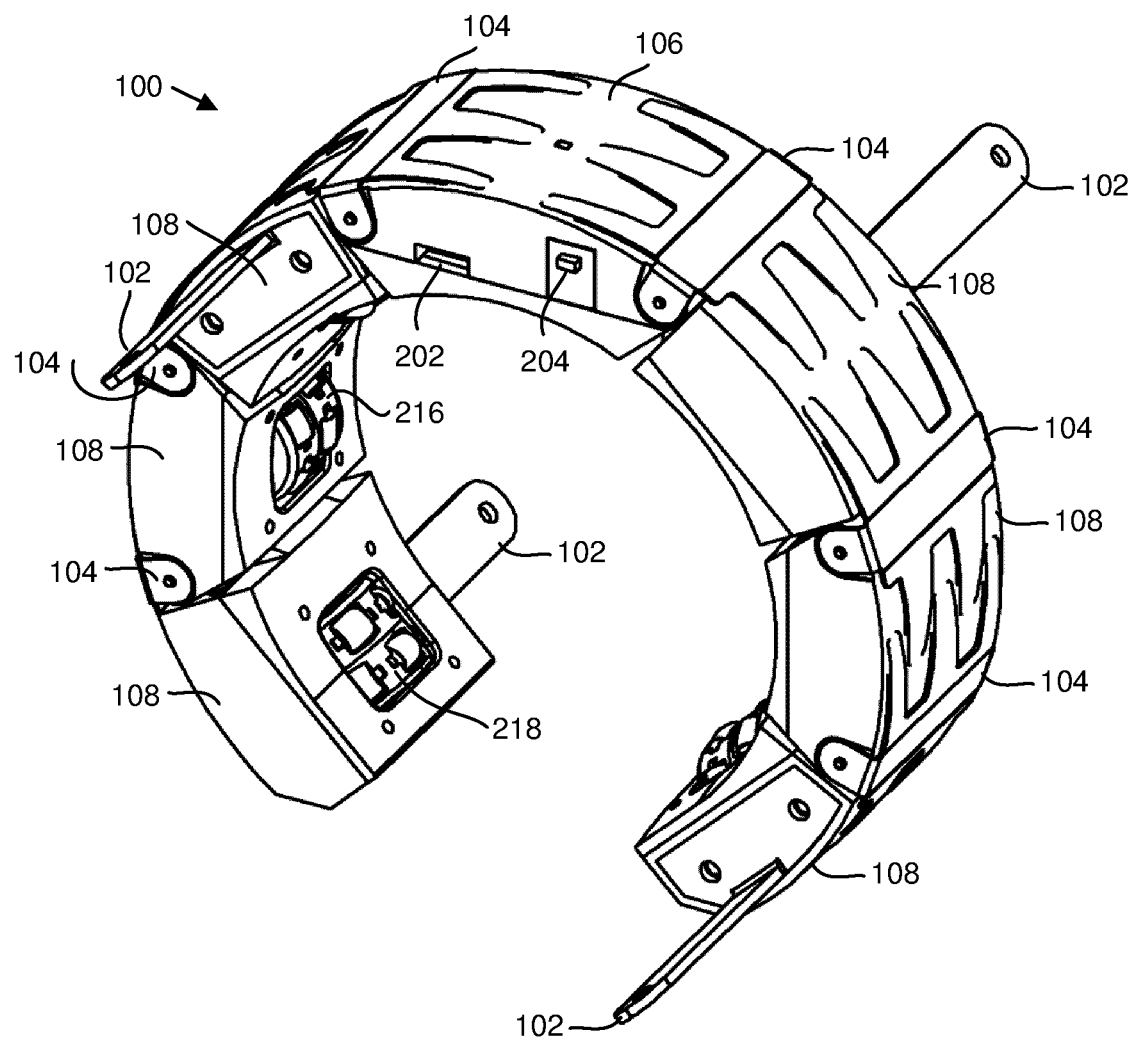
FIG. 2 is a perspective view further illustrating the pipe crawler of FIG. 1.

FIG. 2 further illustrates the pipe crawler 100 of FIG. 1. In the depicted embodiment, the pipe crawler 100 includes an instrument segment 106, drive segments 108, a retention mechanism 104, and brackets 102, substantially as described above with regard to FIG. 1. In the depicted embodiment, the instrument segment 106 includes one or more cable connection ports 202 and a power switch 204, and each drive segment 108 includes an omni wheel 216, 218.

In the depicted embodiment the pipe crawler 100 includes one instrument segment 106 in a middle position, and an equal number of drive segments 108 on either side of the instrument segment 106. In another embodiment, however, one or more instrument segments 106 may be in a position other than a middle position. For example, in one embodiment, two instrument segments 106, such as an x-ray source and an x-ray sensor may be located towards the ends of the plurality of segments 106, 108, so as to be disposed in opposing positions across a pipe. In view of this disclosure, many configurations and positions are clear that are suitable for drive segments 108 and instrument segments 106.

In one embodiment, the pipe crawler 100 includes one or more cable connection ports 202. In some embodiments, the cable connection ports 202 may allow an operator to connect a cable for power or data, for programming the controller, for manual operation of the pipe crawler 100, for connection to another pipe crawler, for retrieving pipe inspection results, or the like. In view of this disclosure, various types of cable connection ports 202, suitable for use with a pipe crawler 100, may be included. In another embodiment, a pipe crawler 100 may omit cable connection ports 202. For example, a pipe crawler may use a removable, rechargeable battery for power, and may transmit and receive data wirelessly.

In some embodiments, the pipe crawler 100 includes a power switch 204, for turning the pipe crawler 100 on or off. In another embodiment, the pipe crawler may not include a power switch, but may turn on or off as a power source is connected or disconnected (e.g., as a power cable is connected or disconnected, or as a battery is installed or removed).

In the depicted embodiment, each drive segment 108 includes an omni wheel 216, 218 as part of a drive mechanism. In various embodiments, an omni wheel 216, 218 includes a wheel and rollers on the surface of the wheel, so that the wheel may roll or be driven in a first direction, and the rollers allow the wheel to slide in a second direction perpendicular to the first direction. In some embodiments, the wheel and/or rollers may be made of rubber, thermoplastic elastomer, or the like, so that the omni wheels 216, 218 grip the pipe without easily slipping. In one embodiment, a first omni wheel 218 may be oriented for moving the pipe crawler 100 along the pipe and a second omni wheel 216 may be oriented for moving the pipe crawler 100 around the pipe. Thus, when the first omni wheel 218 is driven by a motor to move the pipe crawler 100 along the pipe, the second omni wheel 216 slides along the pipe on the rollers of the second omni wheel 216; similarly when the second omni wheel 216 is driven by a motor to move the pipe crawler 100 around the pipe, the first omni wheel 218 slides around the pipe on the rollers of the first omni wheel 218. In the depicted embodiment, each drive segment 108 includes a single omni wheel 216, 218; however, in another embodiment, a drive segment 108 may include a different number of omni wheels 216, 218, or a different type of drive mechanism. Omni wheels 216, 218 and another drive mechanism are described in further detail with regard to FIGS. 9-12.

Figure 3:
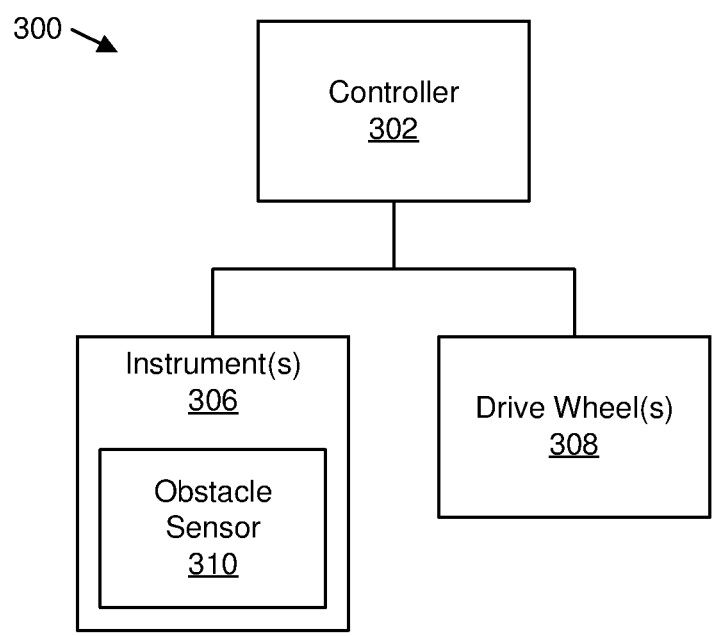
FIG. 3 is a schematic block diagram illustrating one embodiment of a control system for a pipe crawler.

FIG. 3 is a schematic block diagram illustrating one embodiment of a control system 300 for a pipe crawler, such as the pipe crawler 100 of FIGS. 1 and 2. In the depicted embodiment, the control system 300 includes one or more drive segments and/or drive wheels 308 and one or more instrument segments and/or instruments 306, which may be substantially as described with regard to FIGS. 1 and 2, like numbers referring to like elements. In the depicted embodiment, the control system 300 includes a controller 302, which may also be substantially as described above with regard to FIGS. 1 and 2. In one embodiment, an instrument 306 includes an obstacle sensor 310. In another embodiment, however, an instrument 306 in a control system 300 may not include an obstacle sensor 310.

In one embodiment, the controller 302 communicates with the one or more drive segments and/or drive wheels 308 to move the pipe crawler 100, plurality of segments, drive segments, drive mechanisms, and/or drive wheels 308 on the outer surface of the pipe 150. In a further embodiment, the controller 302 operates the one or more instrument segments and/or instruments 306 on the pipe. For example, the controller may operate a camera as an instrument 306 to take pictures of the pipe, and may transmit or record the pictures, analyze the pictures to detect corroded areas, operate a tool as an instrument 306 to clean the corrosion off the pipe, or the like. In view of this disclosure, many ways of using a controller 302 to move a pipe crawler or to operate an instrument 306 are clear.

In one embodiment, the controller 302 may be a computer, programmable logic controller, or the like, for autonomous operation of the pipe crawler. For autonomous operation, in various embodiments, a programmable controller may be programmed via one or more cable connection ports, a wireless interface, or the like. In another embodiment, the controller 302 may be a simple interface that receives input from an operator and communicates with the instrument(s) 306 and/or drive wheel(s) 308 for manual operation of the pipe crawler.

In one embodiment, the controller 302 may be integrated with or disposed inside the pipe crawler. In some examples, the controller 302 is mounted onto or disposed inside of an instrument segment or an instrument 306. In another embodiment, however, the controller 302 may be disposed at a separate location from the drive wheels and/or instruments, for remote control of the pipe crawler, and may communicate with the instruments 306 and/or the drive wheels 308 via a cable connection, or wirelessly. In a further embodiment, the controller 302 may include a local component integrated with the instruments 306, the drive wheels 308, and a remote component.

In one embodiment, an instrument 306, instrument segment, drive wheel 308, and/or drive segment may include a wired connection for communicating with the controller 302. In a further embodiment, a wired connection for an instrument 306, instrument segment, drive wheel 308, and/or drive segment includes a pass-through for transmitting signals between the controller 302 and other instruments 306, instrument segments, drive wheels 308, and/or drive segments, allowing components of a pipe crawler to be daisy-chained together. In another embodiment, individual instruments 306, instrument segments, drive wheels 308, and/or drive segments may include individual wireless transmitters and/or receivers for communicating with the controller 302.

In one embodiment, an obstacle sensor 310 detects obstacles along the pipe. An obstacle may be any feature that the pipe crawler moves to avoid, such as a pipe support, strap, or hanger, a valve, a natural obstruction such as a fallen branch on a pipeline, or the like. An obstacle sensor 310 may detect obstacles visually, by radar, ultrasound, or the like. For example, in one embodiment, an obstacle sensor 310 may include a video camera, and the controller 302 may analyze the video signal to determine if an obstacle is present. In a further embodiment, the obstacle sensor 310 may include a light source such as an LED, to illuminate obstacles when natural light is not sufficient. In view of this disclosure, many ways of detecting obstacles along a pipe are clear.

In one embodiment, the obstacle sensor 310 communicates with the controller 302, and the controller 302 controls the drive segments and/or drive wheels 308 to avoid the obstacles. For example, in an open ring shaped pipe crawler as depicted in FIGS. 1 and 2, the obstacle sensor 310 may detect an obstacle and communicate with the controller 302, and the controller 302 may control the drive segments and/or drive wheels 308 to move the pipe crawler around the pipe so that the obstacle passes through the gap in the open ring as the pipe crawler moves along the pipe.

In another embodiment, the controller 302 may control the drive segments and/or drive wheels 308 to avoid an obstacle in another way. For example, in one embodiment, the controller 302 may control drive segments and/or drive wheels 308 on the sides of the pipe to drive the pipe crawler up, so that a portion of the pipe crawler on the top of the pipe is no longer in contact with the pipe, and passes over an obstacle on the top of the pipe. In another embodiment, the controller 302 may communicate with motor-driven, articulated couplings between segments and/or wheels 308, to crawl over a coupling by moving one side or portion of the pipe crawler at a time. In view of this disclosure, various ways of moving a pipe crawler to avoid obstacles are clear.

Figure 4:
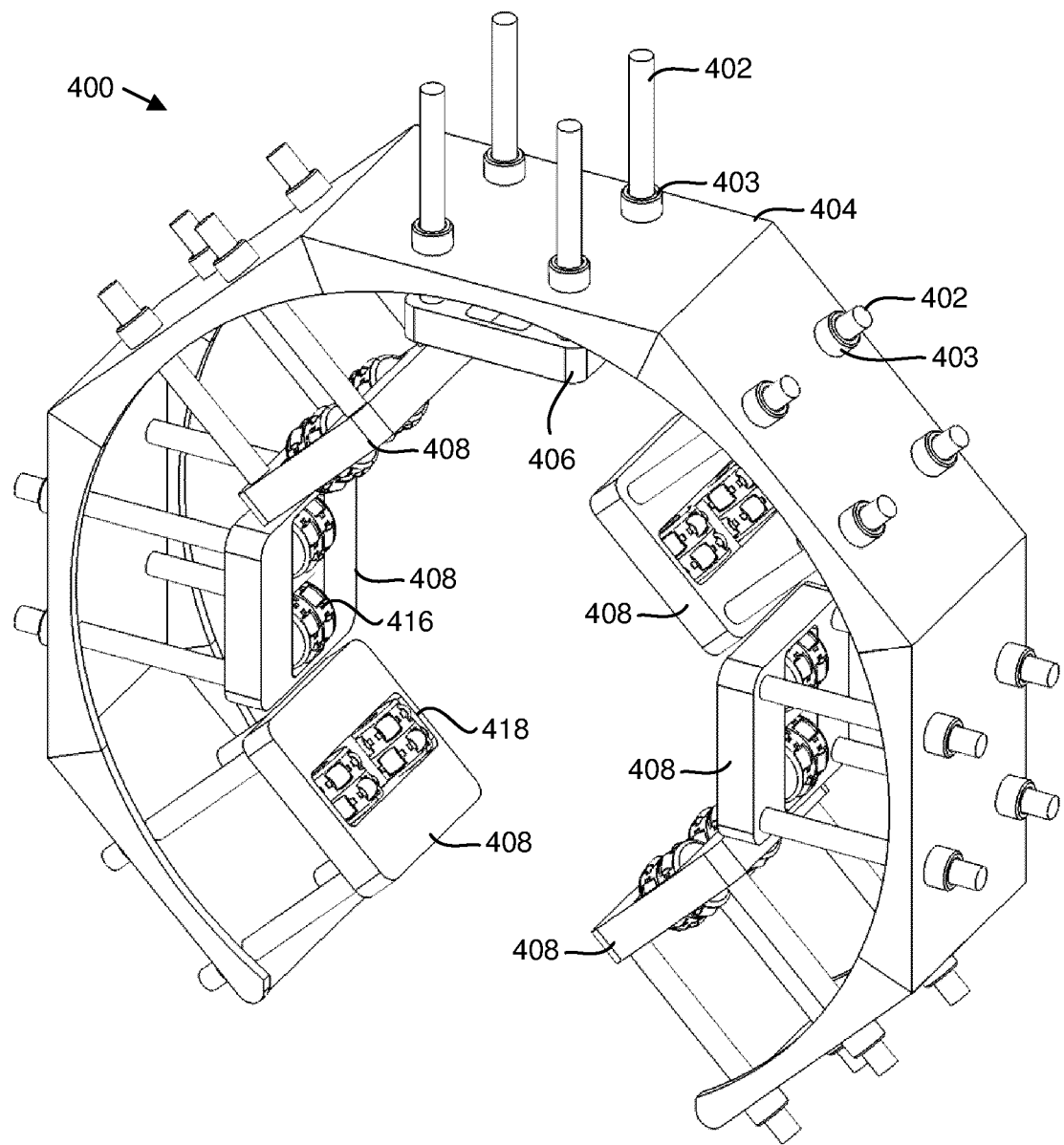
FIG. 4 is a perspective view illustrating another embodiment of a pipe crawler.

FIG. 4 depicts another embodiment of a pipe crawler 400. In the depicted embodiment, the pipe crawler 400 includes an instrument segment 406 and drive segments 408, which are substantially as described above with regard to FIGS. 1 and 2, like numbers referring to like elements. In the depicted embodiment, the drive segments 408 each include two omni wheels 416, 418, substantially as described above with regard to FIG. 2, like numbers referring to like elements, so that omni wheels 416 may be driven for motion around the pipe or may slide along the pipe on rollers, and omni wheels 418 may be driven for motion along the pipe or may slide around the pipe on rollers.

As described above, in various embodiments of a pipe crawler, a retention mechanism retains the segments 406, 408, instruments, and/or drive wheels (e.g., omni wheels 416, 418) in a shape matching an outer surface of the pipe, and provides adjustable positions for the segments 406, 408, instruments, and/or drive wheels, for disposing the segments 406, 408, instruments, and/or drive wheels on the outer surface of the pipe. In the depicted embodiment, the retention mechanism includes a solid open ring 404, and rods 402 coupled to the segments 406, 408, instruments, and/or drive wheels. In some embodiments, the rods 402 extend through openings 403 in the body of the open ring 404. In a further embodiment, the rods 402 are movable within the openings 403, for moving the segments 406, 408, instruments, and/or drive wheels to contact the outer surface of the pipe. In some embodiments, the rods 402 move within the openings 403 for contacting a plurality of pipe contours, such as pipes of different diameters, pipes with elliptical or other non-circular cross-sections, or the like. In some embodiments, an opening 403 includes a sleeve, bearing, bushing, or the like, to facilitate motion of the rod 402 within the opening 403.

In some embodiments, a spring force, hydraulic force, pushrod force, motor force, or the like are applied to the rods to bias the segments 406, 408, instruments, and/or drive wheels inward to contact a pipe. In another embodiment, the spring force or motor force position the drive segments 408 and/or drive wheels against the pipe for moving the pipe crawler 400, and an instrument segment 406 and/or an instrument are positioned at a further distance from the pipe. In a further embodiment, a user may overcome the spring force or may control the motor force, to move segments 406, 408 outward temporarily, in order to dispose the pipe crawler 400 on a pipe by moving the pipe through the gap in the open ring 404.

Figure 5:
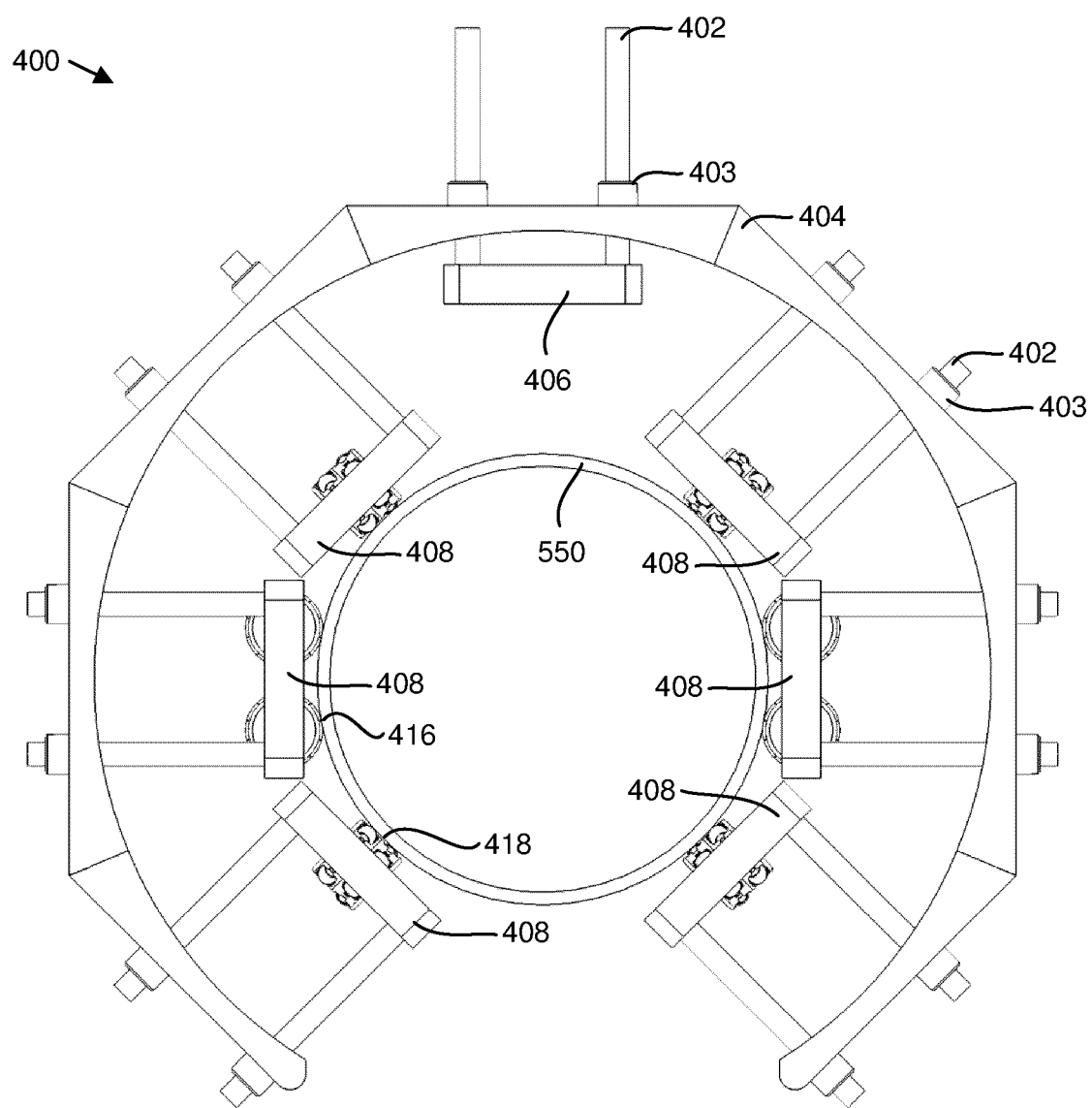
FIG. 5 is a perspective view further illustrating the pipe crawler of FIG. 4 on a small-diameter pipe.
Figure 6:
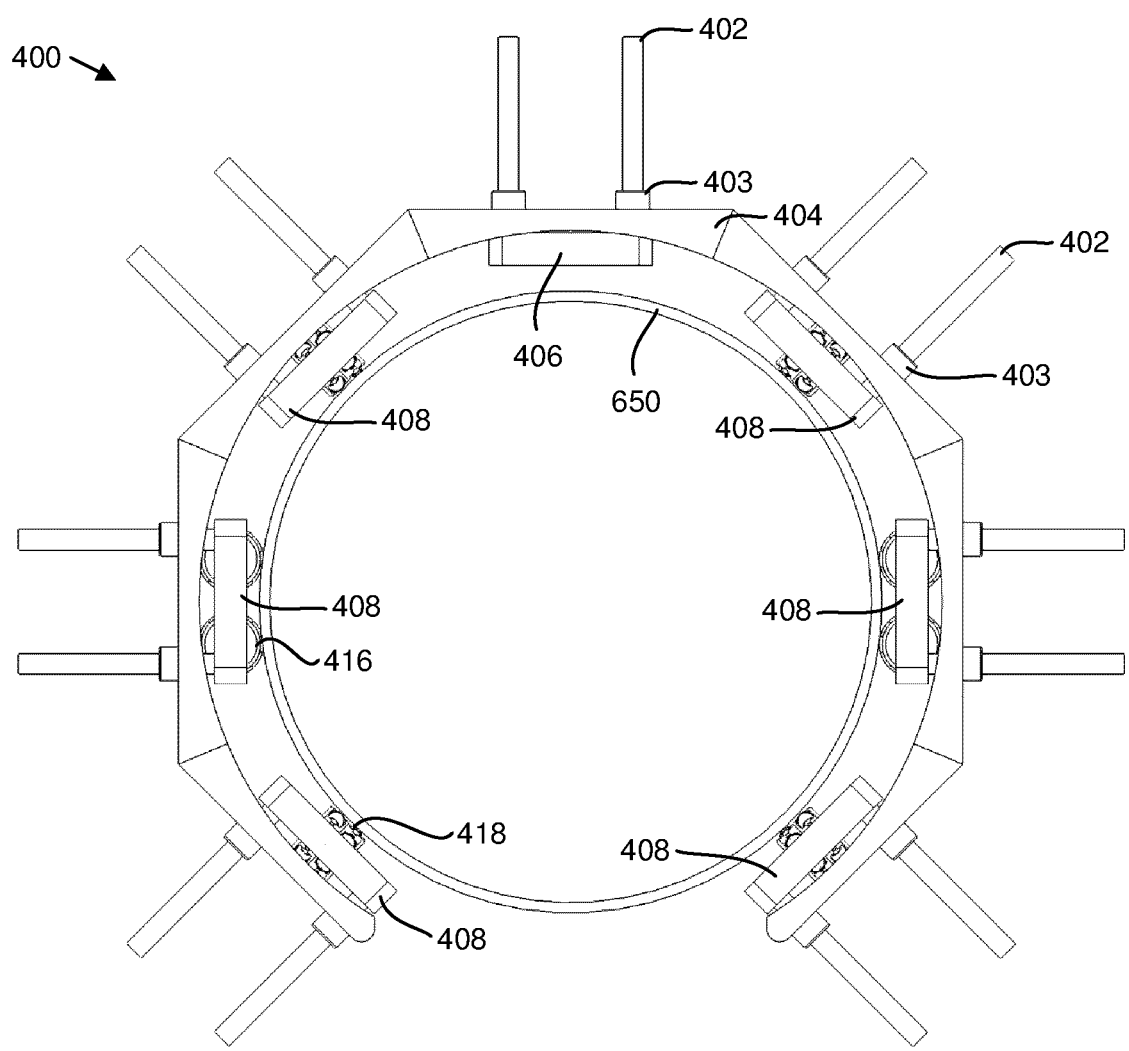
FIG. 6 is a perspective view further illustrating the pipe crawler of FIG. 4 large-diameter pipe.

FIGS. 5 and 6 depict the pipe crawler 400 of FIG. 4 disposed on a small-diameter pipe 550 and a large-diameter pipe 650, respectively. In one embodiment, when the pipe crawler 400 is disposed on a small-diameter pipe 550, the rods 402 move inward through the openings 403 in the solid open ring 404, to dispose the drive segments 408 against the pipe 550. The instrument segment 406 may be positioned adjacent to the pipe 550 (e.g., for milling or welding operations) or may be positioned further away from the pipe 550 as shown (e.g., for camera inspection with a more convenient viewing angle). In another embodiment, when the pipe crawler 400 is disposed on a large-diameter pipe 650, the rods 402 move outward through the openings 403 in the solid open ring 404, so that the segments 406, 408 move to accommodate the larger pipe 650. In a further embodiment, each segment 406, 408 moves inward or outward independently of the other segments 406, 408, to accommodate pipes with elliptical or other non-circular cross-sections.

Figure 7:
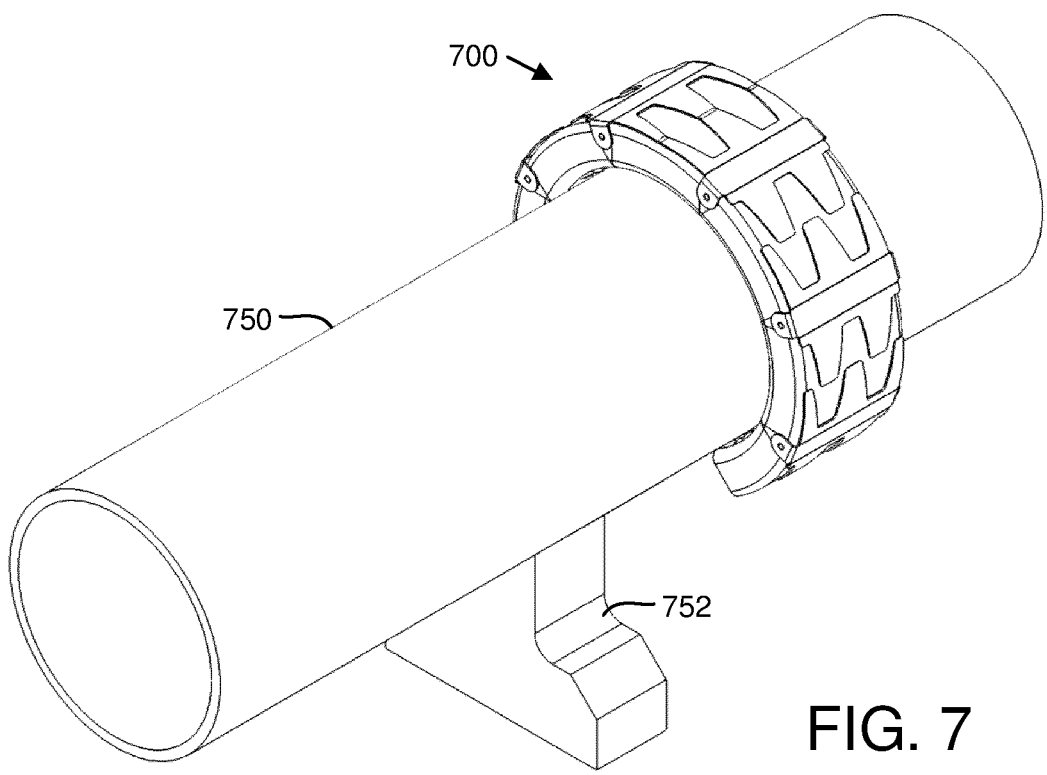
FIG. 7 is a perspective view illustrating another embodiment of a pipe crawler on a pipe with a support.
Figure 8:
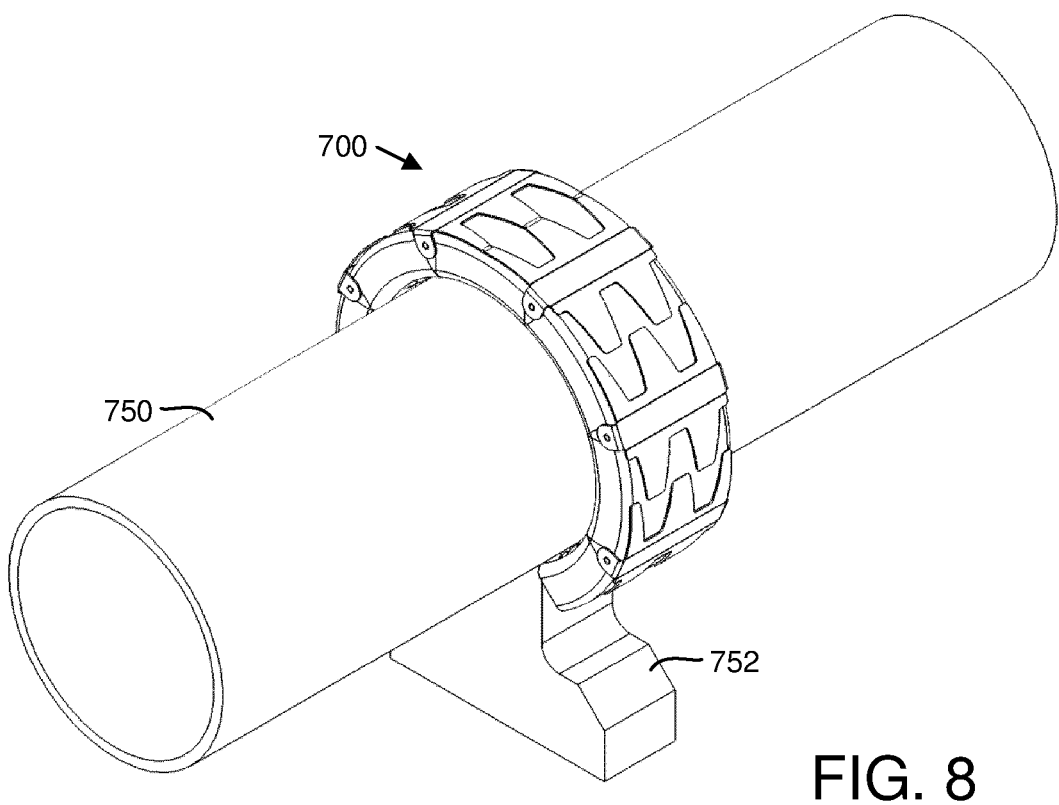
FIG. 8 is a perspective view illustrating the pipe crawler of FIG. 7 avoiding the support while moving along the pipe.

FIGS. 7 and 8 depict a pipe crawler 700, in one embodiment, detecting and avoiding an obstacle 752 along a pipe 750. The pipe crawler 700, in various embodiments have an open ring shape similar to the pipe crawler 100 of FIGS. 1 and 2, or the pipe crawler 400 of FIGS. 4-6. In the depicted embodiment, the obstacle 752 is a support for the pipe. In another embodiment, the obstacle 752 may be a valve, an unexpected obstruction, or the like.

In one embodiment, an obstacle sensor in the pipe crawler 700 detects obstacles 752 before they are encountered. In some examples, in FIG. 7, an obstacle sensor is located in or near a center segment of the pipe crawler 700, and the pipe crawler regularly moves around the pipe 750 to detect obstacles 752 above or below the pipe 750. In another embodiment, an obstacle sensor is located in or near end segments of the pipe crawler 700, to detect obstacles 752 below the pipe 750.

In one embodiment, the obstacle sensor detects the obstacle 752, and communicate with a controller for the pipe crawler 700. The controller, in some embodiments, then communicates with motors for the pipe crawler 700 (e.g., in drive segments or in motorized couplings) to avoid the obstacle 752. For example, in FIG. 8, the controller controls the pipe crawler 700 to move the gap in the open ring shape to the bottom of the pipe 750, where the obstacle 752 is, and then moves the pipe crawler 700 along the pipe 750 so that the obstacle 752 passes through the gap.

Figure 9:
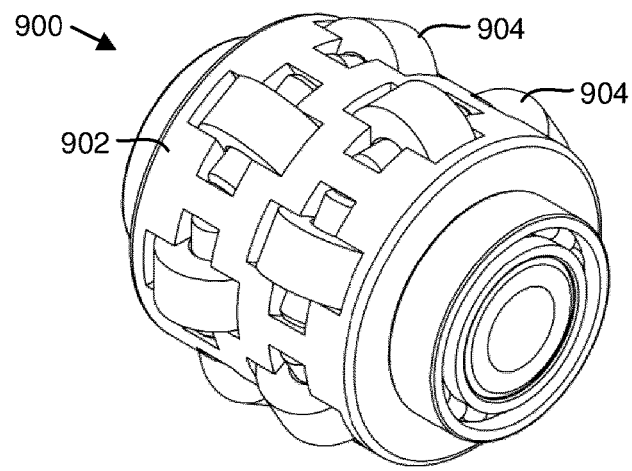
FIG. 9 is a perspective view illustrating one embodiment of an omni wheel.

FIG. 9 depicts one embodiment of an omni wheel 900. In some embodiments, at least one of the drive segments and/or drive wheels for a pipe crawler include an omni wheel 900 and/or a mecanum wheel as described below with regard to FIG. 11. As described above, in the depicted embodiment, the omni wheel 900 includes a wheel 902 and rollers 904 on the surface of the wheel 902. In a further embodiment, the rollers 904 are oriented so that the wheel 902 roll or be driven in a first direction, while the rollers 904 allow the wheel 902 to slide (by rolling on the rollers 904) in a second direction perpendicular to the first direction. In various embodiments, omni wheels 900 or mecanum wheels in the drive segments of a pipe crawler allow the pipe crawler to move around a pipe, along the pipe, or simultaneously around and along the pipe in a spiral trajectory, and allow the pipe crawler to move along or around a horizontal pipe, a vertical pipe, a diagonal pipe, or the like.

Figure 10:
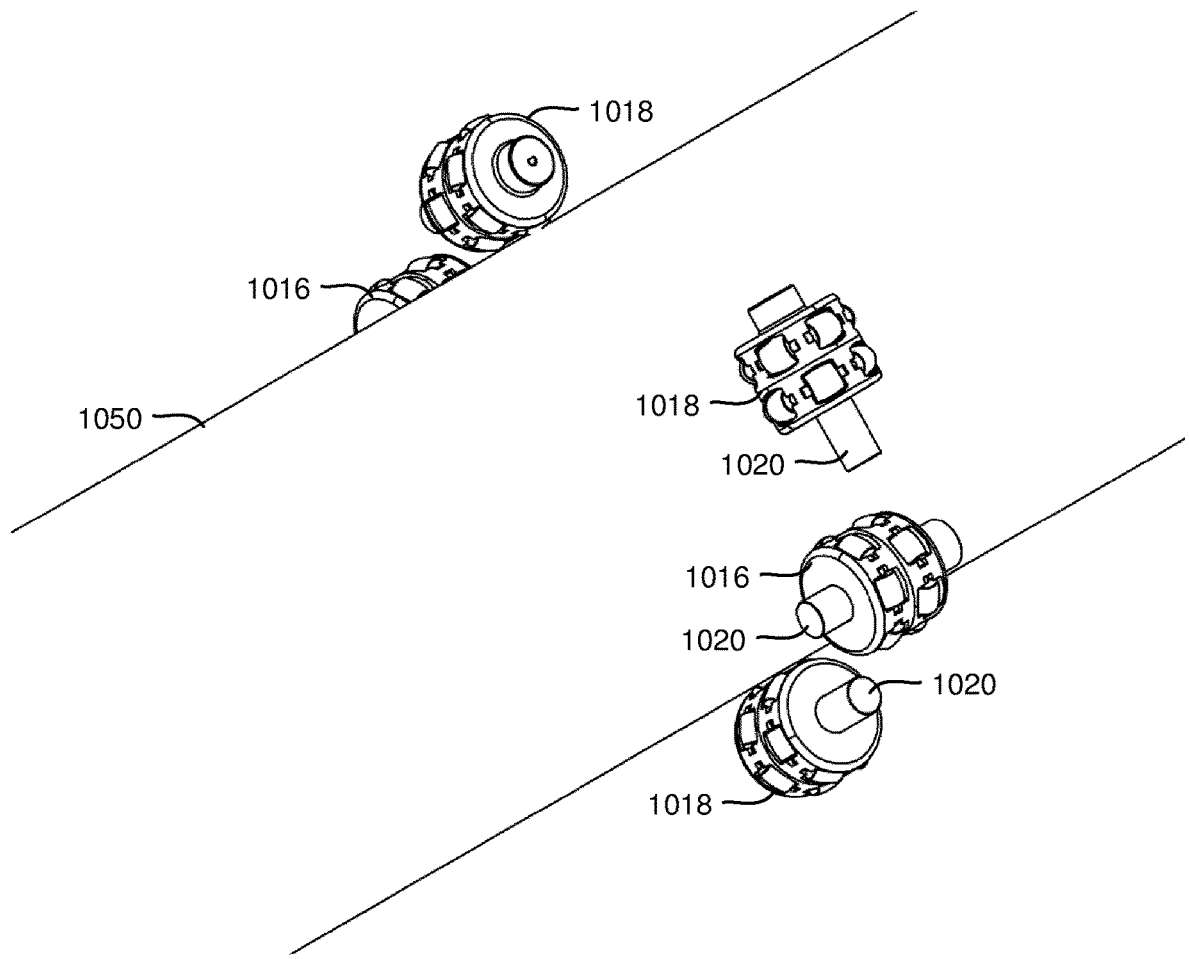
FIG. 10 is a perspective view illustrating multiple omni wheels for one embodiment of a pipe crawler, on a pipe.

FIG. 10 depicts multiple omni wheels 1016, 1018 for one embodiment of a pipe crawler, on a pipe 1050. Parts of the pipe crawler are not shown, for clarity in seeing the omni wheels 1016, 1018. In the depicted embodiment, each omni wheel 1016, 1018 is driven by a motor 1020. In one embodiment, a first omni wheel 1018 or set of omni wheels 1018 is oriented for moving a plurality of pipe crawler segments along the pipe 1050. For example, in the depicted embodiment, the first set of omni wheels 1018 is oriented so that the motors 1020 drives the omni wheels 1018 along the pipe 1050, and rollers on the omni wheels 1018 allow motion around the pipe 1050. In a further embodiment, a second omni wheel 1016 or set of omni wheels 1016 is oriented for moving a plurality of pipe crawler segments around the pipe 1050. For example, in the depicted embodiment, the second set of omni wheels 1016 is oriented so that the motors 1020 drive the omni wheels 1016 around the pipe 1050, and rollers on the omni wheels 1016 allow motion along the pipe 1050. In one embodiment each drive segment for the pipe crawler includes one or more of the omni wheels 1016, 1018 and motors 1020, so that one or more of the motors 1020 operates one or more of the drive segments. In the depicted embodiment, the motors 1020 fit into axle holes for the omni wheels 1016, 1018, and drive the omni wheels 1016, 1018 directly. However, in another embodiment, a motor is shaped differently or is larger than the axle hole for an omni wheel 1016, 1018, and drives an omni wheel 1016, 1018 via gears, belts, pulleys, chains, or the like.

Figure 11:
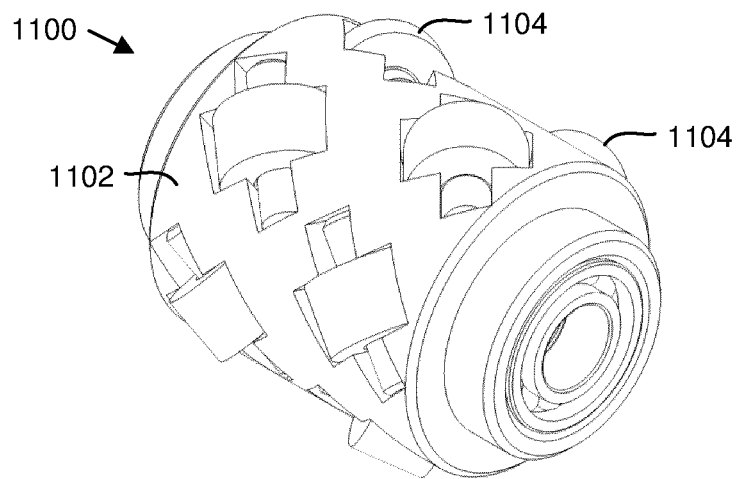
FIG. 11 is a perspective view illustrating one embodiment of a mecanum wheel.

FIG. 11 depicts one embodiment of a mecanum wheel 1100. Like the omni wheel 900 described above with regard to FIG. 9, the mecanum wheel 1100 includes a wheel 1102 and rollers 1104 on the surface of the wheel 1102. In a further embodiment, unlike the omni wheel 900, the rollers 1104 are oriented so that the wheel 1102 roll or be driven in a first direction, while the rollers 1104 allow the wheel 1102 to slide (by rolling on the rollers 1104) in a second direction at a 45 degree angle to the first direction. In various embodiments, a parallel pair of mecanum wheels 1100 have rollers 1104 oriented in opposite directions, so that the mecanum wheels 1100 corotate to move a pipe crawler in a first direction (e.g., perpendicular to the axis of a wheel 1102), counterrotate to move the pipe crawler in a second direction (e.g., parallel to the axis of a wheel 1102), or rotate independently to move the pipe crawler in the first direction and the second direction simultaneously.

Figure 12:
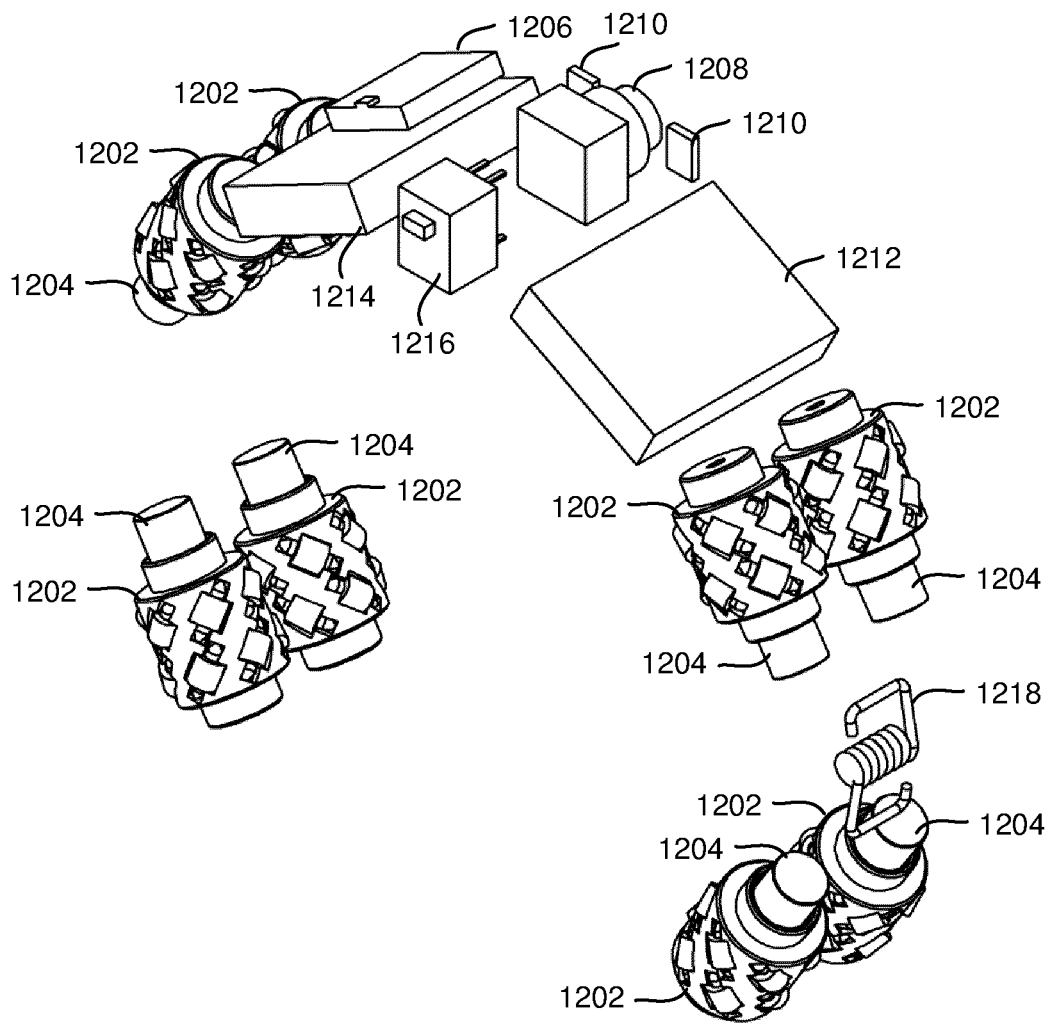
FIG. 12 is a perspective view illustrating multiple mecanum wheels for one embodiment of a pipe crawler.

FIG. 12 depicts multiple mecanum wheels 1202 for one embodiment of a pipe crawler. As in FIG. 10, parts of the pipe crawler are not shown, for clarity in seeing the mecanum wheels 1202. In the depicted embodiment, each mecanum wheel 1202 is driven by a motor 1204. In the depicted embodiment, the pipe crawler further includes a wireless radio transmitter and/or receiver 1206, a video camera 1208, light sources 1210, batteries 1212, 1214, and a power switch 1216. Springs 1218 couple adjacent segments, and act as a retention mechanism for the pipe crawler, as described above.

In one embodiment, rollers for the mecanum wheels 1202 have opposite orientations for each pair of mecanum wheels 1202. Thus, if the mecanum wheels 1202 corotate, the pipe crawler will be driven along a pipe. Similarly, if the mecanum wheels 1202 counterrotate, the pipe crawler will be driven around the pipe. In the depicted embodiment, each mecanum wheel 1202 has an independent motor 1204, and a controller controls the motors 1204 to move the pipe crawler around and/or along the pipe.

In one embodiment, each pair of mecanum wheels 1202 is in a drive segment, so that one or more of the motors 1204 operates one or more of the drive segments. In a further embodiment, one or more instrument segments include the wireless transmitter and/or receiver 1206, video camera 1208, light sources 1210, batteries 1212, 1214, and power switch 1216. In one embodiment the wireless radio transmitter and/or receiver 1206 allows a user to communicate with the controller to program the controller, send commands for moving the pipe crawler or for operating an instrument segment, receive pipe inspection data, receive telemetry indicating the position of the pipe crawler along the pipe, or the like.

In some embodiments, one battery 1214 powers the motors 1204 for the drive segments, and another battery 1212 powers the video camera 1208, light sources 1210, or other instruments for the instrument segment. In a further embodiment, the power switch 1216 controls power from one or more batteries 1212, 1214, to turn the pipe controller on or off.

In one embodiment, the video camera 1208 is part of an obstacle sensor as described above. In another embodiment, the video camera 1208 is used to inspect a pipe. In further embodiments, light sources 1210 are LED lamps or other optical sources that produce light used by the video camera 1208 to detect obstacles or inspect the pipe.

Figure 13:
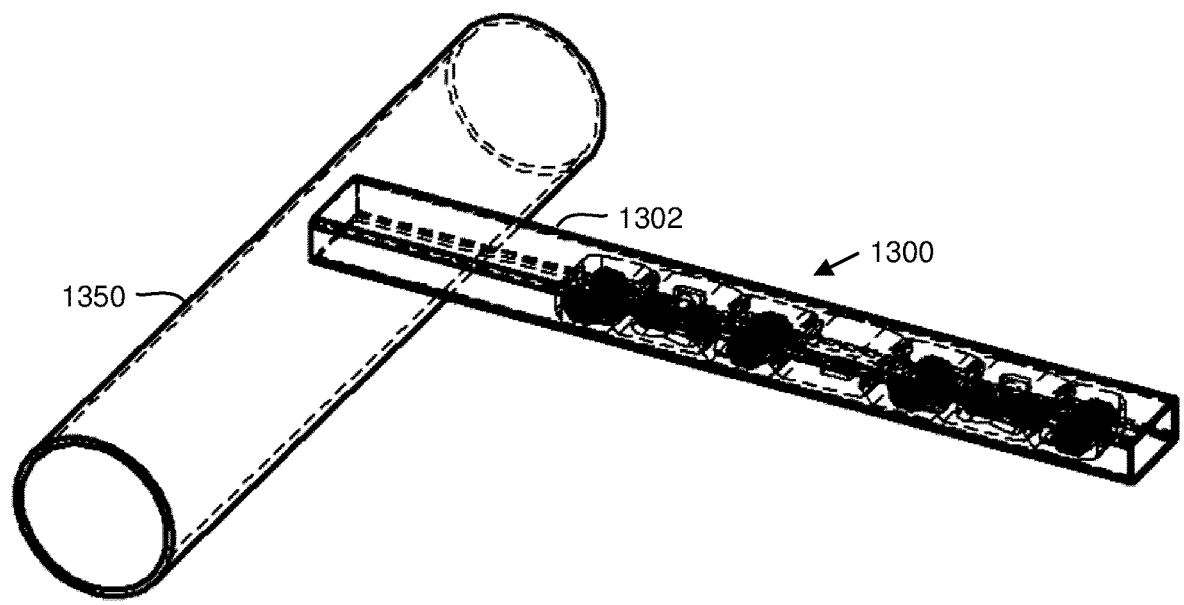
FIG. 13 is a perspective view illustrating one embodiment of a feeder tube, enclosing one embodiment of a pipe crawler, for delivering the pipe crawler to a pipe.
Figure 14:
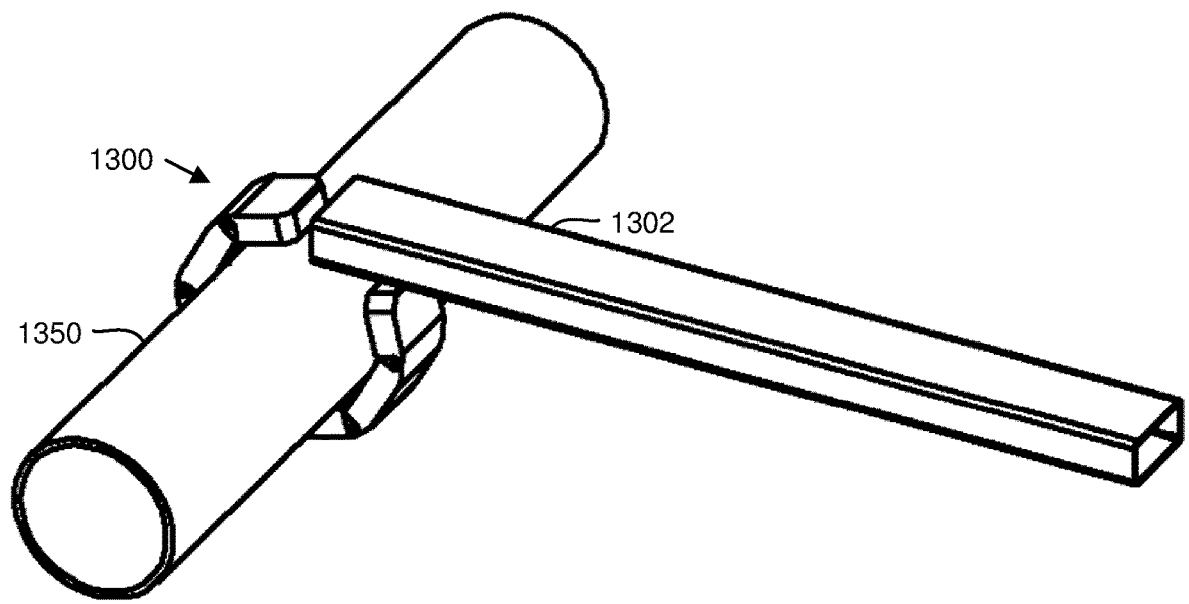
FIG. 14 is a perspective view illustrating one embodiment of a pipe crawler after emerging from the feeder tube of FIG. 13, onto the pipe.

FIGS. 13 and 14 depict one embodiment of a feeder tube 1302 for delivering a pipe crawler 1300 to a pipe 1350. In one embodiment, the pipe crawler 1300 is substantially as described above with regard to the pipe crawler 100 of FIGS. 1 and 2. In various embodiments, a feeder tube 1302 is used to deliver a pipe crawler 1300 to a pipe 1350 if it is impractical for the pipe crawler 1300 to be delivered manually to the pipe 1350 due to temperature, radiation, a hazardous chemical environment, a lack of access space, narrow spacing in a pipe rack as in FIG. 15, or the like.

In one embodiment, the feeder tube 1302 encloses the pipe crawler 1300, for delivering the pipe crawler 1300 to the pipe 1350, as depicted in FIG. 13. In a further embodiment, the retention mechanism for the pipe crawler 1300 (e.g., springs and couplers for adjacent segments) deforms in the feeder tube 1302 such that the pipe crawler 1300 is retained in the feeder tube 1302 in a linear shape prior to emerging from the feeder tube 1302. In various embodiments, deforming into a linear shape in the feeder tube 1302 allows the pipe crawler 1300 and feeder tube 1302 to pass through small spaces, which the pipe crawler 1300 could not pass through in a shape matching the outside of a pipe 1350.

In one embodiment, the feeder tube 1302 encloses the pipe crawler 1300 to deform the retention mechanism (e.g., springs). In another embodiment, the retention mechanism deforms in the feeder tube 1302 in another way. For example, in one embodiment, the retention mechanism includes motor-driven, articulated couplings between segments, and a controller controls the couplings to deform the retention mechanism. In a further embodiment, a feeder trough, a feeder platform, or the like replace the feeder tube 1302 if the retention mechanism deforms without being enclosed.

FIG. 14 depicts the pipe crawler 1300 on the pipe 1350, subsequent to emerging from the feeder tube 1302. As the pipe crawler 1300 emerges from the feeder tube 1302, the retention mechanism retains the pipe crawler 1300 segments against the outer surface of the pipe 1350. For example, springs or motors in the retention mechanism bends the segments back into position around the pipe 1350, as the pipe crawler emerges from the feeder tube 1302. After emerging from the feeder tube 1302, the pipe crawler 1300 treats the feeder tube 1302 as an obstacle on the pipe 1350, and avoids the obstacle as described above with regard to the obstacle sensor.

In one embodiment, drive segments drives the pipe crawler 1300 through the feeder tube 1302 to the pipe 1350, and/or around the pipe 1350 so that the pipe crawler fully emerges from the feeder tube 1302. In a further embodiment, the feeder tube 1302 is inclined downward so that gravity assists the motion of the pipe crawler 1300 through the feeder tube.

Figure 15:
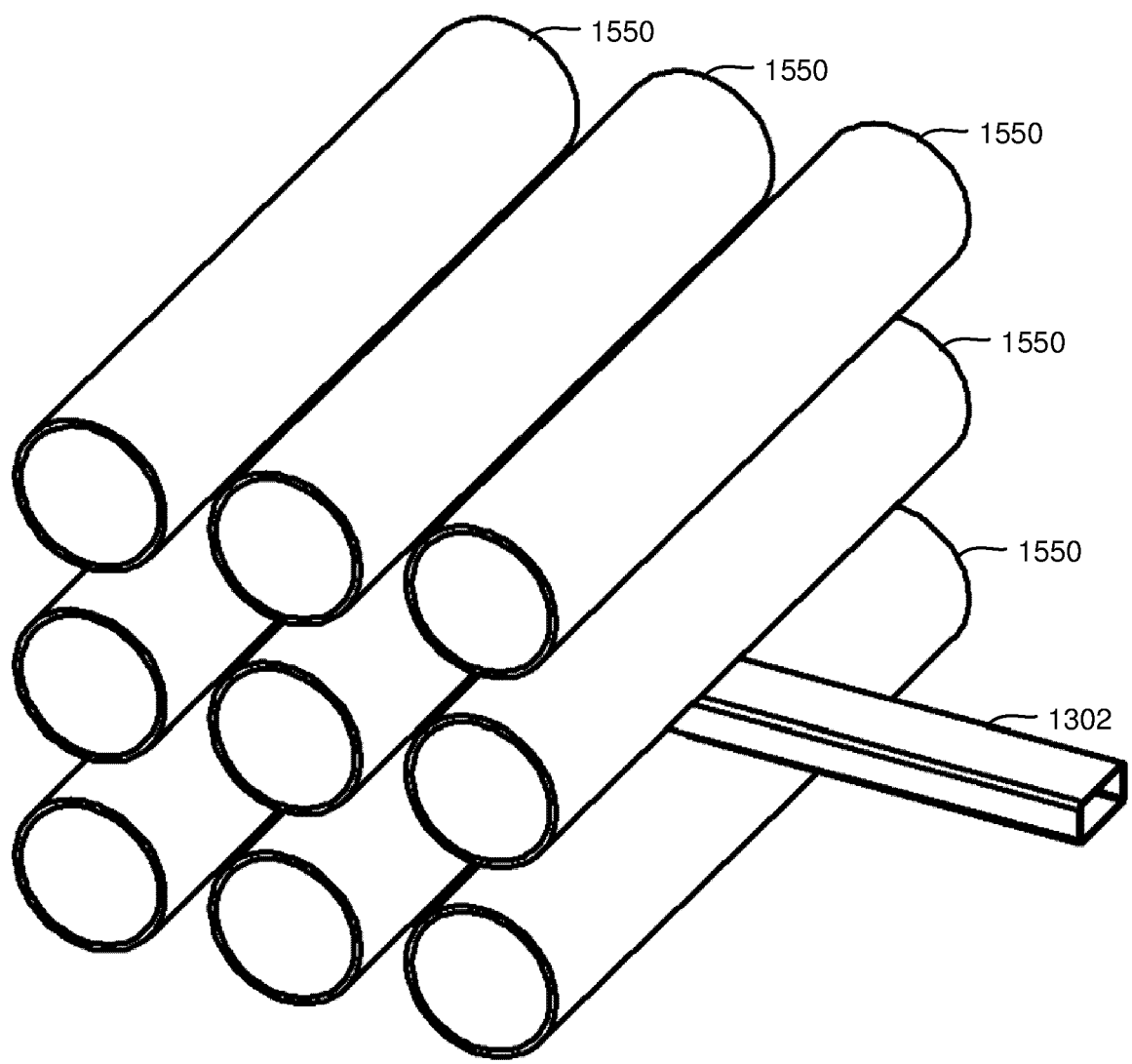
FIG. 15 is a perspective view illustrating one embodiment of a feeder tube with multiple pipes.

FIG. 15 depicts the feeder tube 1302 of FIGS. 13 and 14 with multiple pipes 1550. In the depicted embodiment, the feeder tube 1302 fits between the pipes 1550, for delivering the pipe crawler to an otherwise inaccessible pipe 1550. In a further embodiment, the pipe crawler 1300 has a low profile for each segment so as to fit in the feeder tube 1302 and between the pipes 1550.

Figure 16:
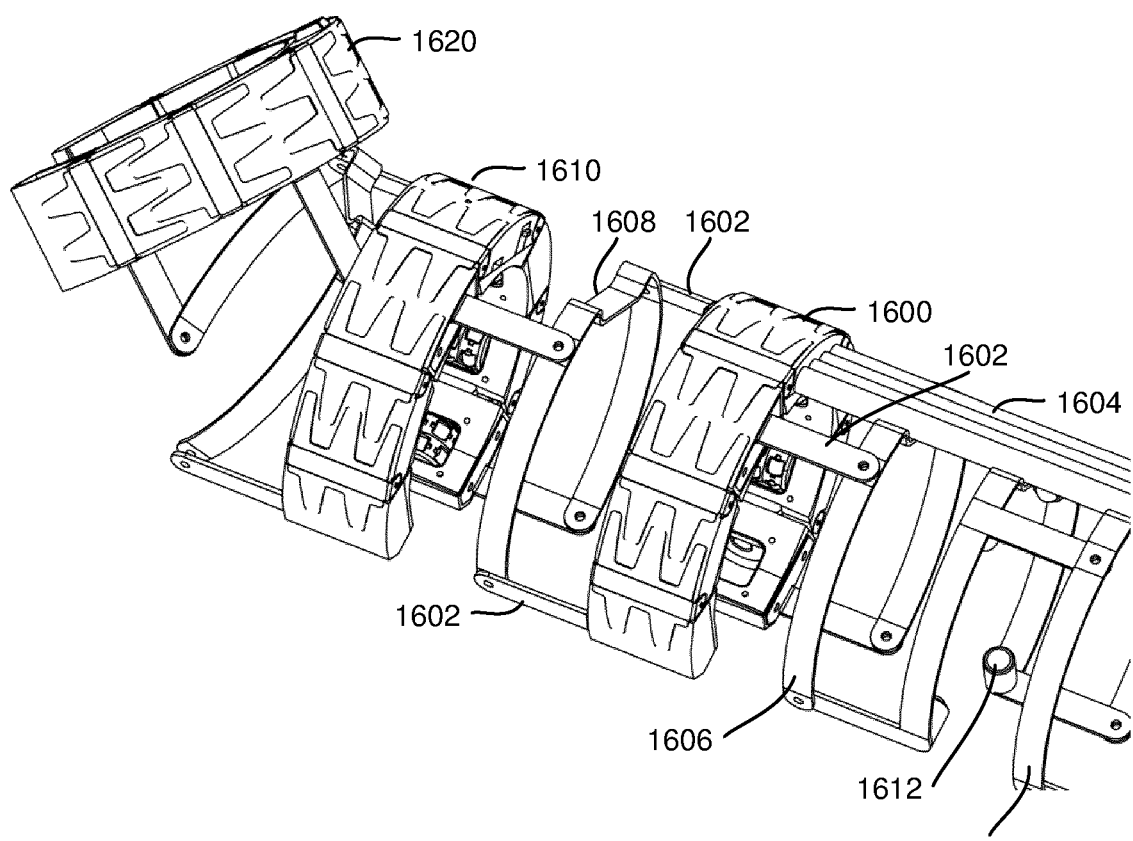
FIG. 16 is a perspective view illustrating one embodiment of a pipe crawler with brackets that extend to additional pipe crawlers and cable supports.

FIG. 16 depicts one embodiment of a pipe crawler 1600 with brackets 1602 that extend to additional pipe crawlers 1610, 1620 and cable supports 1606. In the depicted embodiment, the cable supports 1606 support cables 1604 away from the surface of the pipe, thus avoiding damage that may occur if the cables 1604 contact the pipe or become tangled.

In one embodiment, one or more brackets 1602 extend from the segments of the pipe crawler 1600 to flexibly connect the plurality of segments to a cable support 1606 and/or segments of an additional pipe crawler 1610, 1620. The bracket 1602 may be flexible, or may include a hinge, a universal joint, a ball and socket joint, or the like that bends so that multiple connected pipe crawlers 1600, 1610, 1620 and/or cable supports 1606 traverse a bend in a pipe.

In one embodiment, additional pipe crawlers 1610, 1620 includes additional instrument segments for performing multiple inspection and maintenance operations on a pipe. In another embodiment additional pipe crawlers 1610, 1620 includes additional batteries, drive segments or the like. In a further embodiment, controllers for the pipe crawlers 1600, 1610, 1620 communicates to coordinate the motion and operations of the pipe crawlers 1600, 1610, 1620.

In one embodiment, one or more cables 1604 are connected to the segments of the pipe crawler 1600, to the controller of the pipe crawler 1600, or the like. In various embodiments, one or more cables 1604 transmit data and/or power to or from the pipe crawler 1600. In one embodiment, a plurality of cable supports 1606 support the one or more cables 1604. In a further embodiment, each cable support 1606 is connected to the pipe crawler 1600 or to an additional cable support 1606 by brackets 1602. In some embodiments, multiple cable supports 1606 extend a distance away from the pipe crawlers 1600, 1610, 1620, to increase the distance for which cables 1604 are supported.

In one embodiment, a cable support 1606 includes a connector 1608 that couples one or more cables 1604 to the cable support. For example, in the depicted embodiment, the connector 1608 is a recess in the cable support 1606, where cables 1604 may rest. In another embodiment, a connector encloses the cables 1604 or otherwise couple cables 1604 to the cable support 1606. In a further embodiment, the connector 1608 is slidably coupled to a pipe to allow the cable support 1606 to move along the pipe. For example, in the depicted embodiment, the connector 1608 is disposed in an open ring shaped support 1606, that surrounds a pipe, and one or more standoffs 1612 support the open ring at a distance from the pipe, and allow the connector 1608 and the open ring shaped support 1606 to slide along the pipe.

Figure 17:
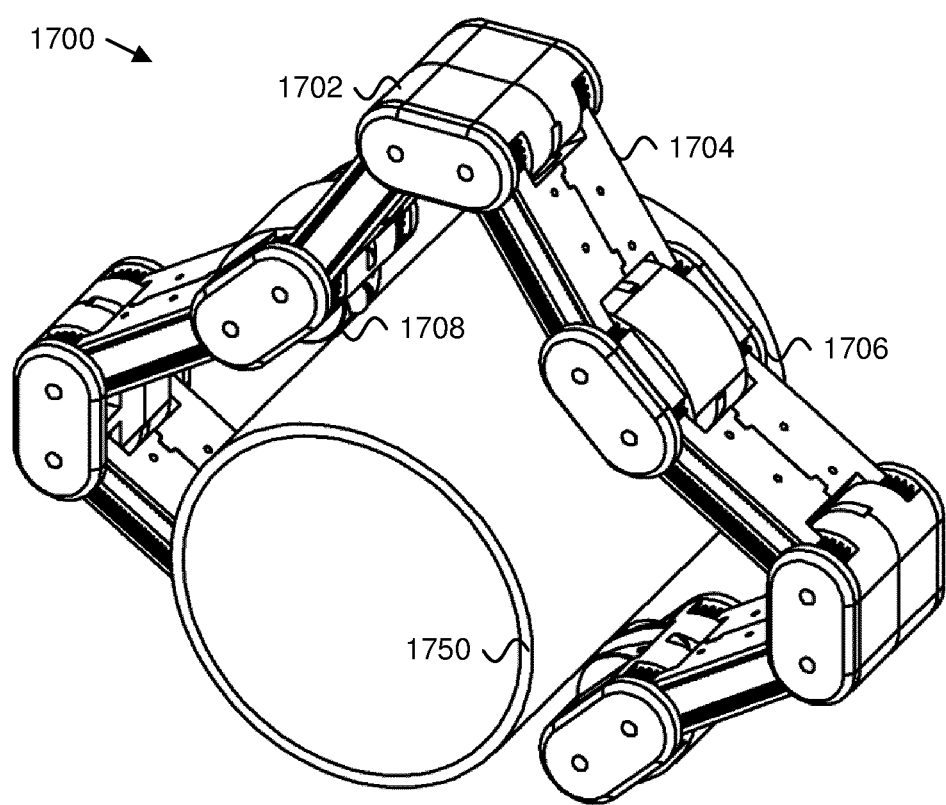
FIG. 17 is a perspective view illustrating another embodiment of a pipe crawler on a pipe.

FIG. 17 is a perspective view illustrating another embodiment of a pipe crawler 1700 on a pipe 1750. In the depicted embodiment, the pipe crawler 1700 includes a plurality of servos 1702, connecting arms 1704, drive segments 1706 and drive wheels 1708, which are described below.

In the depicted embodiment, the pipe crawler 1700 is designed to operate on external surfaces of pipes 1750 in tight spaces with varied narrow clearances between the surface of an operated-on pipe and surfaces of other pipes or other objects close by. If the clearance between close pipes and other close objects is sufficiently wide, a pipe crawler 1700 capable of inspecting and repairing pipes of various diameters, where the maximum diameter to the minimum diameter ratio (D max/D min ratio) is 5 or higher, can be used.

Drive segments 1706 and drive wheels 1708 are substantially as described above with reference to various embodiments of pipe crawlers. In the depicted embodiment, the drive wheels 1708 are mecanum wheels, and drive axles of the drive wheels 1708 are positioned parallel to the axis of the pipe 1750. Positioning axles of mecanum wheels parallel to an axis of the pipe 1750 provides lower positioning accuracy and/or movement force than using omni wheels with some axles parallel to the pipe axis and some axles perpendicular to the pipe axis, but also, in some embodiments, provides a pipe crawler 1700 that is simpler to build and/or maintain than a pipe crawler with omni wheels.

In some embodiments, the pipe crawler 1700 consists of one, two or more sections. A section, in various embodiments, includes four mecanum wheels as drive wheels 1708: two clockwise wheels and two counterclockwise wheels positioned to rotate in opposite directions on the pipe surface, and three servos 1702 tasked to press the mecanum wheels to the pipe surface.

In the depicted embodiment, a retention mechanism for the pipe crawler 1700 includes servos 1702 that position the drive wheels 1708 against the outer surface of the pipe 1750. Servos 1702, in various embodiments, are servomotors that are driven electrically, hydraulically, pneumatically, or the like. In further embodiments, servos 1702 include position sensing using a potentiometer, a rotary encoder or the like, and is configured to move to a position commanded by a controller. A controller may be substantially as described above. In another embodiment, servos 1702 are replaced by motors other than servomotors, such as stepper motors, with a position controlled by a controller.

In a further embodiment, the retention mechanism includes connecting arms 1704 that couple the servos 1702 to the drive wheels 1708 and/or to the drive segments 1706. In the depicted embodiment, three servos 1702 are disposed in sequence between four drive segments 1706, and each servo 1702 is coupled via two connecting arms 1704 to two drive segments 1706 on either side of the servo 1702. In further embodiments, a servo 1702 is driven or controlled to control the angle at which two connecting arms 1704 meet, and thus to position the drive wheels 1708 against the outer surface of the pipe 1750.

Instruments, in various embodiments, are substantially as described above, and are disposed in or coupled to drive segments 1706, in connecting arms 1704, and/or in housings for the servos 1702. In some examples, a camera is mounted to the outside of a servo housing. In another embodiment, an ultrasonic sensor is mounted within a drive segment 1706. In some embodiments, instruments are balanced on either side of the pipe crawler 1700 so that the center of gravity of the pipe crawler 1700 is at or near a central axis of a pipe 1750. Various other or further ways of disposing instruments in a pipe crawler 1700 will be clear in view of this disclosure.

Figure 18:
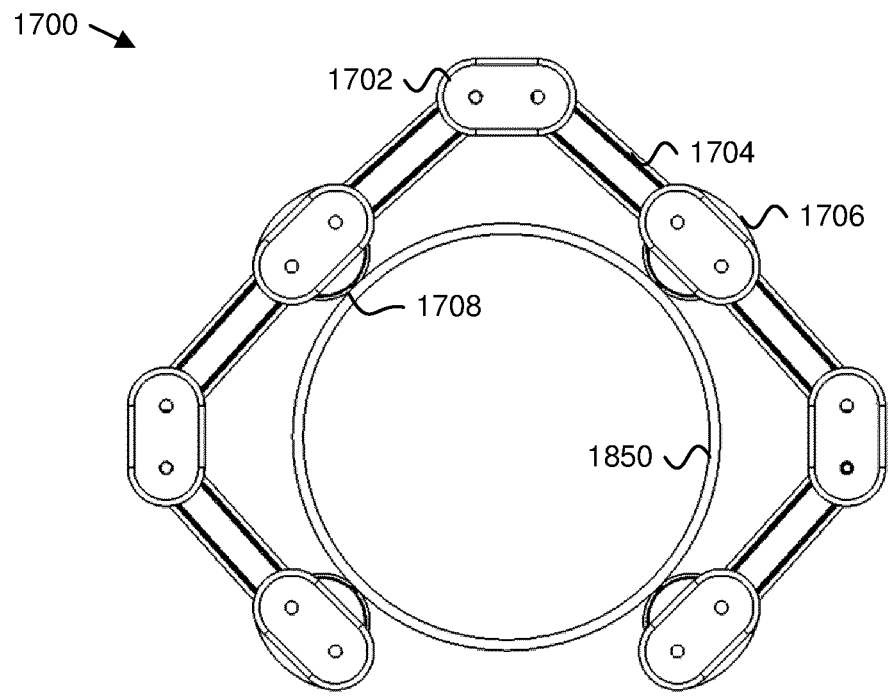
FIG. 18 is a side view further illustrating the pipe crawler of FIG. 17 on a large-diameter pipe.
Figure 19:
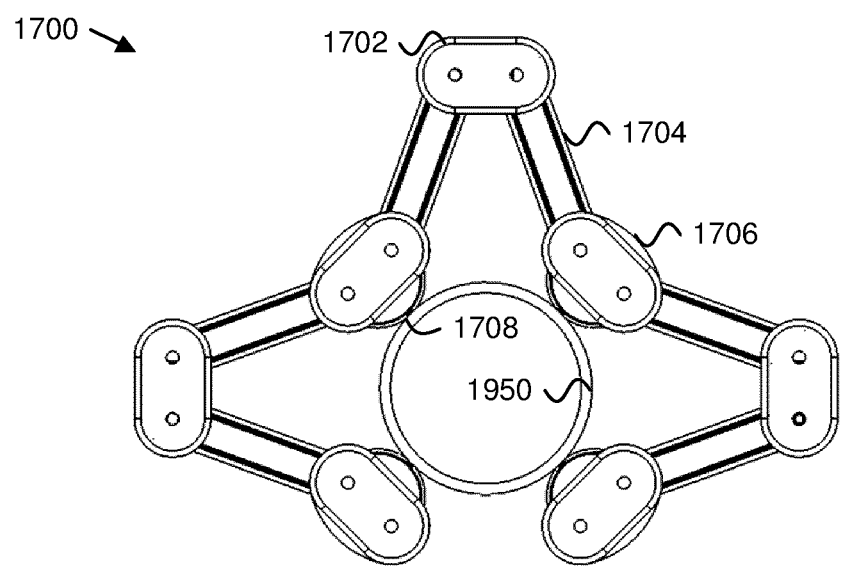
FIG. 19 is a side view further illustrating the pipe crawler of FIG. 17 on a small-diameter pipe.

FIGS. 18 and 19 depict the pipe crawler 1700 of FIG. 17 on a large-diameter pipe 1850, and on a small-diameter pipe 1950, respectively. In one embodiment, as depicted in FIG. 18, servos 1702 are driven or controlled to position pairs of connecting arms 1704, where they meet at the servos 1702, at a larger angle than in FIG. 19 (e.g., an angle of approximately 90° or slightly greater is depicted). The depicted position for the connecting arms 1704 results in drive wheels 1708 being spaced farther apart than in FIG. 19, to accommodate (and to be positioned against) a large-diameter pipe 1850.

Conversely, as depicted in FIG. 19, servos 1702 may be driven or controlled to position pairs of connecting arms 1704, where they meet at the servos 1702, at a smaller angle than in FIG. 18 (e.g., an acute angle is depicted). The depicted position for the connecting arms 1704 results in drive wheels 1708 being spaced closer together than in FIG. 18, to accommodate (and to be positioned against) a small-diameter pipe 1850.

Figure 20:
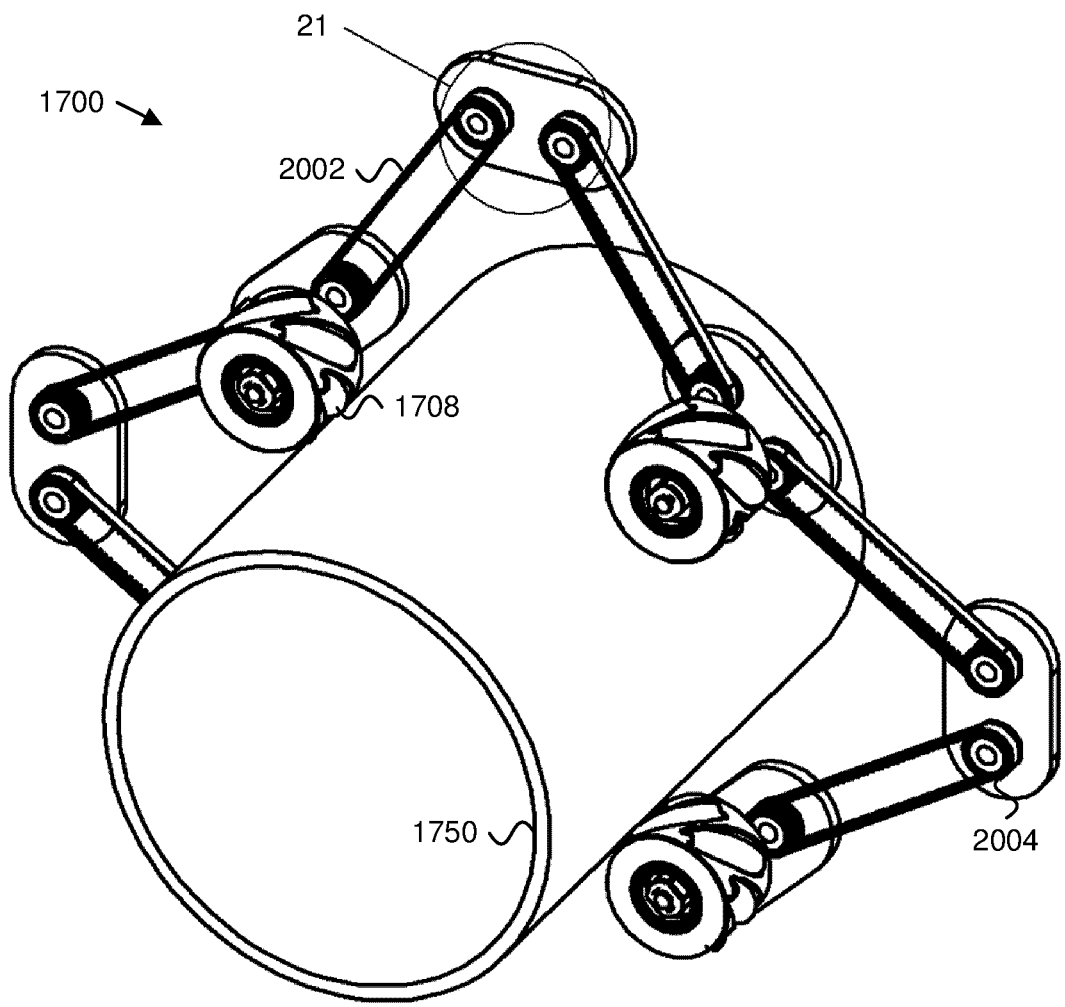
FIG. 20 is a cutaway perspective view further illustrating the pipe crawler of FIG. 17.
Figure 21:
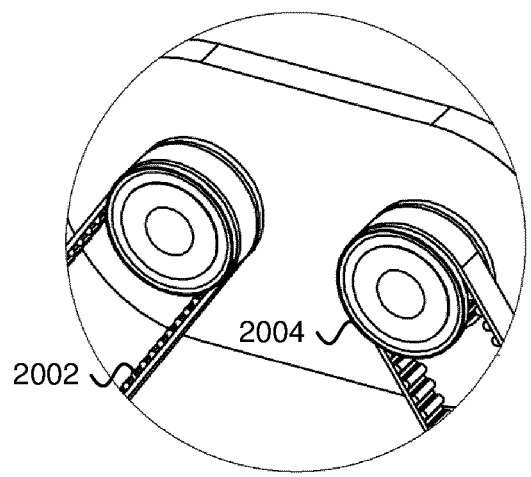
FIG. 21 is a perspective view illustrating one embodiment of toothed belts and toothed pulleys for the pipe crawler of FIG. 17.

FIGS. 20 and 21 depict one embodiment of toothed belts 2002 and toothed pulleys 2004 for the pipe crawler of FIG. 17. FIG. 21 is a cutaway view with drive segments 1706 and servos 1702 not depicted, showing toothed pulleys 2004 where they would be disposed in drive segments 1706 and in housings for servos 1702. FIG. 21 is a closeup, as indicated by a circle in FIG. 20, showing toothed belts 2002 and toothed pulleys 2004 at a housing for a servo 1702.

In the depicted embodiment, each drive segment 1706 and servo housing includes a pair of toothed pulleys 2004 mounted or coupled to the drive segment 1706 or servo housing. In a further embodiment, toothed belts 2002 connect toothed pulleys 2004 between drive segments 1706 and servo housings. The toothed belts 2002, in some embodiments, are disposed within or running through connecting arms 1704. Toothed belts 2002, in some embodiments, are flexible belts which may include an outer material such as rubber, polymer, or the like, and which may include an inner reinforcement material such as fabric, nylon fibers, aramid fibers, carbon fibers, or the like. In further embodiments, toothed belts 2002 include teeth formed or molded on an inner surface, to engage with matching teeth on toothed pulleys 2004. For example, a toothed belt 2002 and a pair of toothed pulleys 2004 may be similar to a timing belt and timing belt pulleys for an internal combustion engine, or to other synchronous belts such as motorcycle drive belts.

In general, in various embodiments, a toothed belt 2002 connects two toothed pulleys 2004 with matching diameters, so that turning one of the toothed pulleys 2004 through an angle turns the toothed pulley 2004 at the other end of the toothed belt 2002 through the same angle, in the same direction (e.g., both counterclockwise, or both clockwise). In further embodiments, the toothed pulleys 2004 are coupled to gears at the ends of connecting arms 1704, as described below.

Figure 22:
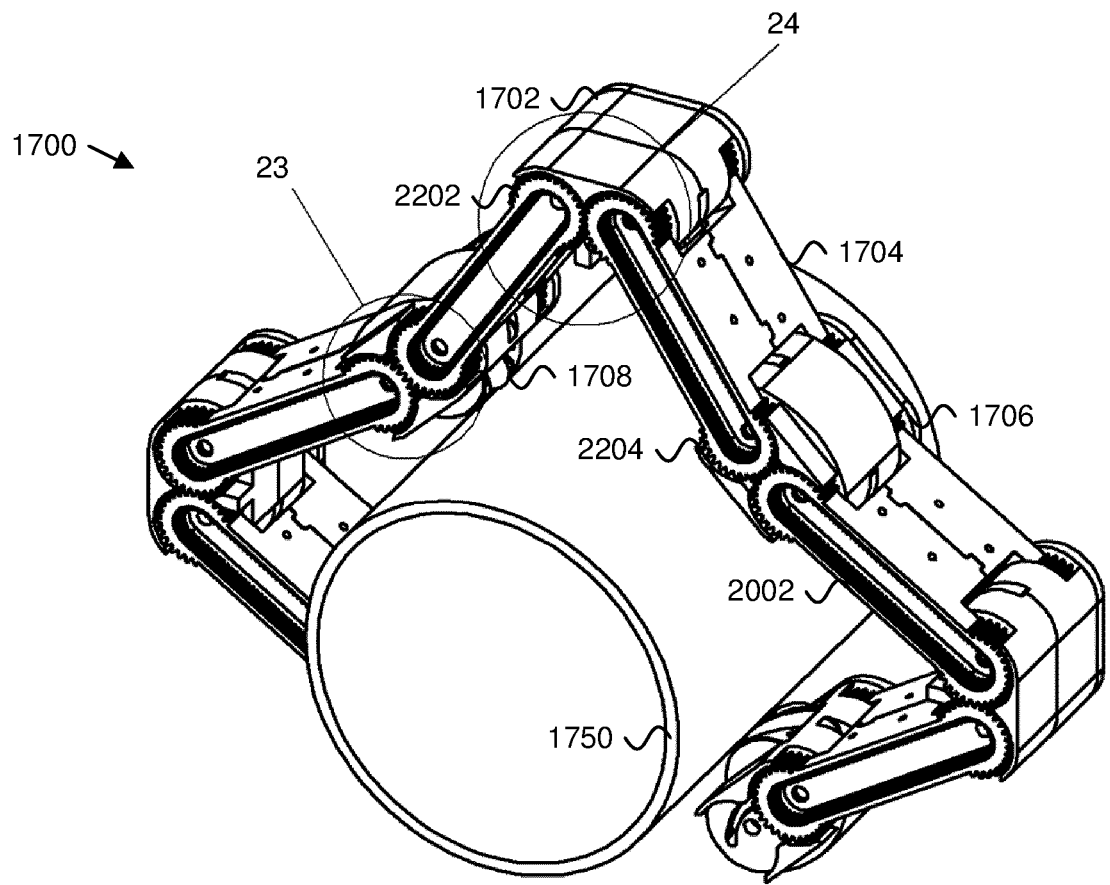
FIG. 22 is a cutaway perspective view further illustrating the pipe crawler of FIG. 17.
Figures 23, 24:
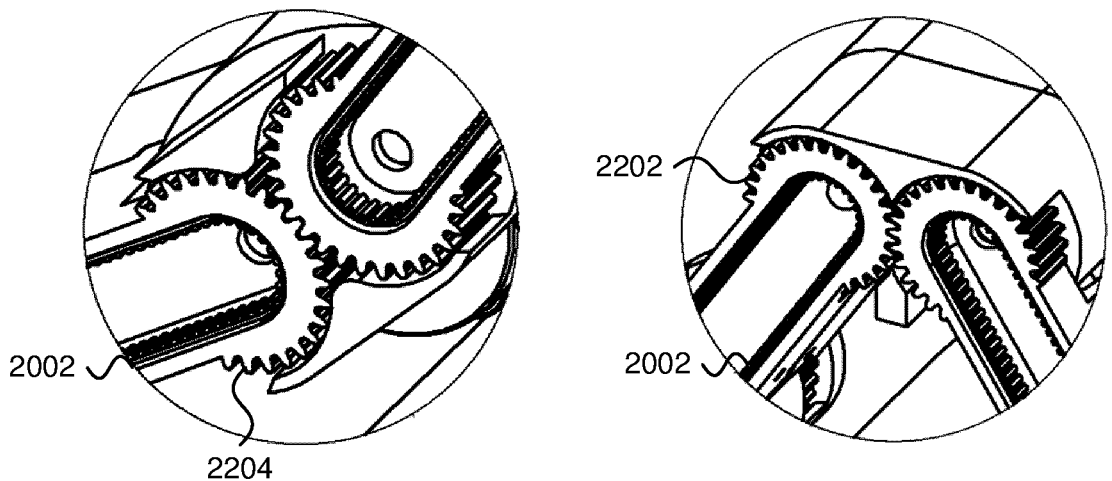
FIG. 23 is a perspective view illustrating one embodiment of gears for the pipe crawler of FIG. 17.
FIG. 24 is a perspective view illustrating a further embodiment of gears for the pipe crawler of FIG. 17.

FIGS. 22-24 depict one embodiment of gears 2202, 2204 for the pipe crawler 1700 of FIG. 17. FIG. 22 depicts the pipe crawler with end plates of the drive segments 1706 and the servo housings removed, so that the gears 2202, 2204 may be seen. FIG. 23 is a closeup, as indicated by a circle in FIG. 22, showing gears 2204 within a drive segment 1706. FIG. 24 is a closeup, as indicated by a circle in FIG. 22, showing gears 2202 within a servo housing. Toothed belts 2002 are depicted in FIGS. 22-24, but toothed pulleys 2004 are not depicted, for clarity in showing gears 2202, 2204.

In some embodiments, gears 2202 in servo housings are coupled to gears 2204 in drive segments 1708 by connecting arms 1704. In one embodiment, a linear connecting arm 1704 connects two circular gears 2202, 2204. In another embodiment, gears 2202, 2204 are formed integrally with a connecting arm 1704, so that the connecting arm has gear teeth at each end. In the depicted embodiment, the gears 2202 in a servo housing are coupled to a pair of connecting arms 1704 that meet at the servo housing so that an angle of one connecting arm 1704 relative to the servo housing is symmetric to (e.g., equal but opposite to) an angle of the other connecting arm 1704 relative to the servo housing. Thus, the angle between the pair of connecting arms 1704 may become more acute or more obtuse symmetrically, without changing the orientation of the servo housing relative to the pipe 1750.

In the depicted embodiment, the gears 2204 in a drive segment 1706 are similarly coupled to a pair of connecting arms 1704 that meet at the drive segment 1706 so that an angle of one connecting arm 1704 relative to the drive segment 1706 is symmetric to (e.g., equal but opposite to) an angle of the other connecting arm 1704 relative to the drive segment 1706. Thus, the angle between the pair of connecting arms 1704 may become more acute or more obtuse symmetrically, without changing the orientation of the drive segment 1706 relative to the pipe 1750.

Gears 2202 and/or toothed pulleys 2004 within servo housings, in some embodiments, are driven by servos 1702. In the depicted embodiment, a servo 1702 turning one of the gears 2202 in a servo housing, or turning a toothed pulley 2004 coupled to the gear 2204 will result in the other gear 2202 in the same servo housing turning through the same angle in an opposite direction, and will result in the toothed belt 2002 moving to turn a toothed pulley 2004 and gear 2204 at the other end of a connecting arm 1704, in a drive segment 1706, in the same direction as the first gear 2202. That gear 2204 in the drive segment 1706 may then turn the other gear in the gear 2204 in the drive segment 1706 in the opposite direction.

In various embodiments, the depicted chain of gears 2202, 2204, toothed belts 2002, and toothed pulleys 2004 maintain an orientation of the drive segments 1706 relative to a pipe when the diameter of the pipe crawler 1700 is adjusted to accommodate a larger or smaller pipe. In some examples, to accommodate a smaller pipe than the depicted pipe 1750, the servos 1702 are controlled or driven to reduce the angle between pairs of connecting arms 1704 where they meet at servo housings. In other examples, the angle between connecting arms 1704 is reduced by 10° by moving one of the connecting arms 1704 or gears 2202 through an angle of 5° so that the other connecting arm 1704 or gear 2202 moves through a symmetric angle of 5°. Turning a gear 2202 through an angle of 5° also results in turning a gear 2204 at the other end of the connecting arm 1704 through an angle of 5°, because the motion of the first gear 2202 is coupled to the motion of the second gear 2204 via a toothed belt 2002 and toothed pulleys 2004.

Thus, narrowing the angle of the connecting arms 1704 by 10° at each of the servo housings widens the angle of the connecting arms 1704 by 10° at each of the drive segments 1706, so that the drive wheels 1708 are positioned closer together for a smaller-diameter pipe without changing the orientation of the drive segments 1706 or of the servo housings relative to a pipe. More generally, in the depicted embodiment, narrowing or widening the angle of the connecting arms 1704 by a particular angle at each of the servo housings respectively widens or narrows the angle of the connecting arms 1704 by the same angle at each of the drive segments 1706, so that the drive wheels 1708 are positioned, respectively, closer together or further apart for different diameters of pipes, without changing the orientation of the drive segments 1706 or of the servo housings relative to a pipe. The servos 1702, in further embodiments, are controlled or driven at the same time by a controller, so that the angle of connecting arms 1704 at each of the servo housings is the same.

Figure 25:
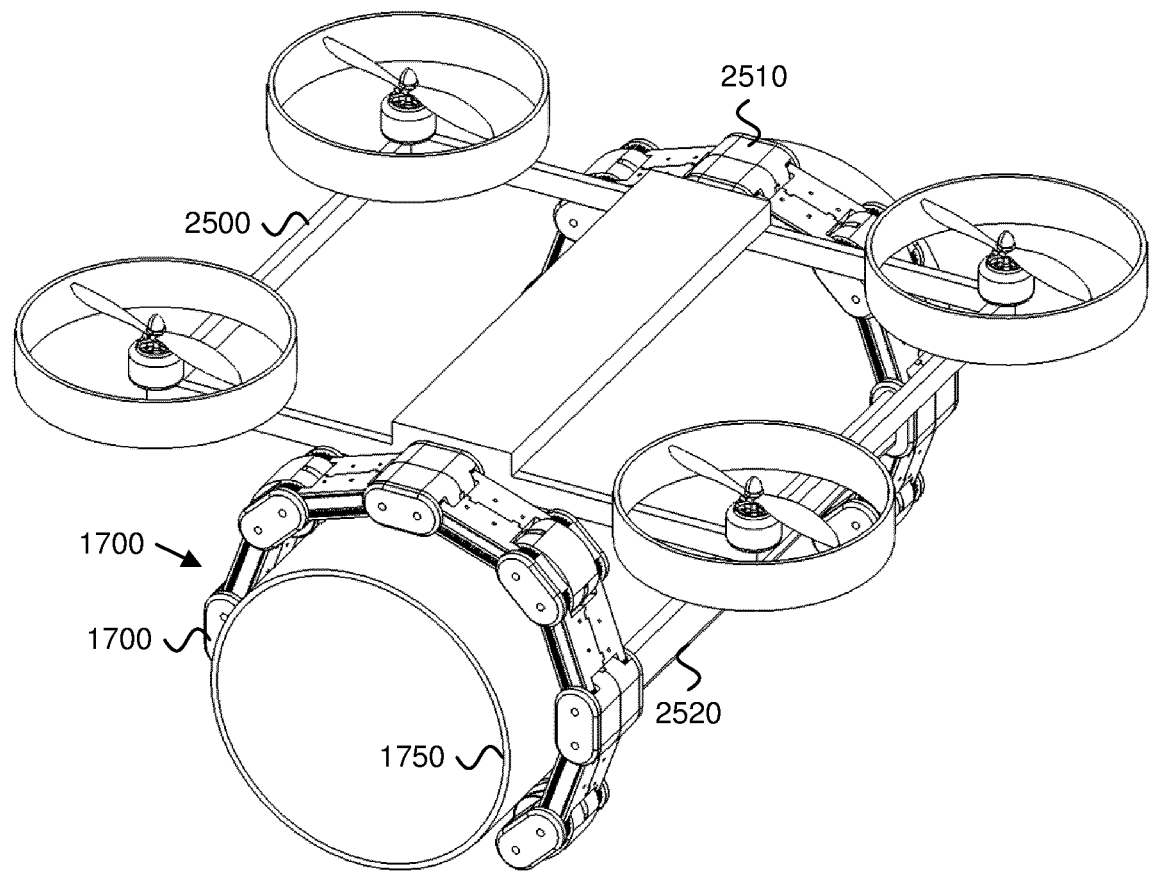
FIG. 25 is a perspective view illustrating one embodiment of a drone for delivery of one or more pipe crawlers.

FIG. 25 depicts one embodiment of a drone 2500 for delivery of one or more pipe crawlers 1700, 2510. A drone 2500, in various embodiments, includes an unmanned aerial vehicle, such as a helicopter, a bi-copter, a quadcopter, or the like, and is piloted autonomously (e.g., via an automated on-board controller), or is piloted remotely by a human. In one embodiment, a drone 2500 is an aircraft capable of hovering for pipe crawler delivery. A drone 2500, in some embodiments, delivers one or more pipe crawlers 1700, 2510 to a pipe. For example, in the depicted embodiment, the drone 2500 is coupled to two pipe crawlers 1700, 2510, which are substantially similar to the pipe crawler 1700 of FIG. 17. The drone 2500, in some embodiments, carries the pipe crawlers 1700, 2510 to an elevated pipe. In another embodiment, a drone 2500 carries fewer or more than two pipe crawlers 1700, 2510 for delivery to an elevated pipe. The drone 2500 can be a dedicated drone retrofitted to a pipe crawler 1700 or, in some embodiments, is a standard drone carrying a mounted pipe crawler 1700.

In the depicted embodiment, the pipe crawlers 1700, 2510 are connected by one or more couplings 2520. Couplings 2520, in some embodiments, include Cardan shafts, universal joints, or the like, allowing coupled pipe crawlers 1700, 2510 to travel around a curved pipe. Coupling two pipe crawlers 1700, 2510 together, in various embodiments, provide more places for instruments to be disposed, more drive power for transporting heavy instruments, or the like.

Figure 26:
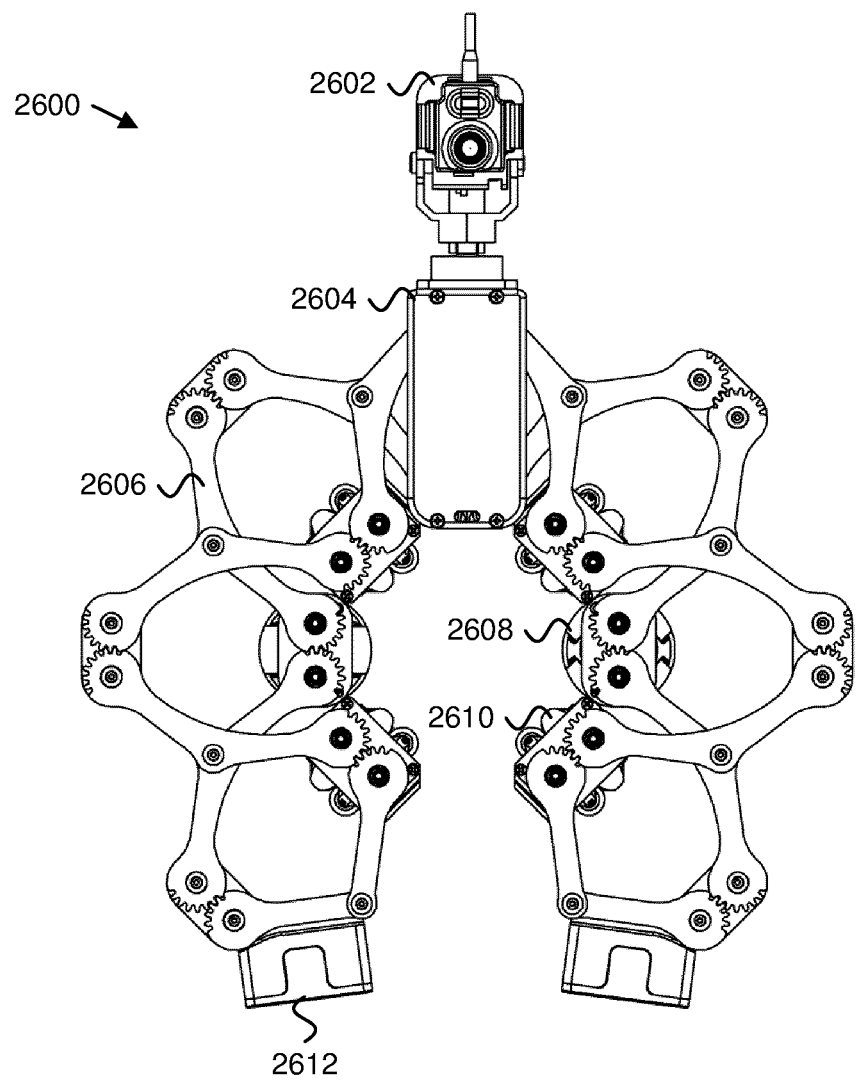
FIG. 26 is a side view illustrating another embodiment of a pipe crawler.

FIG. 26 depicts another embodiment of a pipe crawler 2600. In the depicted embodiment, the pipe crawler 2600 includes instruments 2602, 2612 (e.g., including a camera 2602 and sensors 2612), which are substantially as described above. In the depicted embodiments, the pipe crawler 2600 further includes drive wheels 2608, 2610, connecting arms 2606, and a linear actuator 2604, which are described below.

The drive wheels 2608, 2610, in the depicted embodiment, are omni wheels as described above. In one embodiment, the drive wheels 2608, 2610, include four omni wheels 2610 oriented for moving the pipe crawler 2600 along a pipe, and two omni wheels 2608 oriented for moving the pipe crawler 2600 around a pipe.

In the depicted embodiment, the connecting arms 2606 couple the drive wheels 2608, 2610 together and couple the drive wheels 2608, 2610 to the linear actuator 2604. The connecting arms 2606 include geared ends similar to the connecting arms 1704 described above for the pipe crawler 1700 of FIG. 17. In the depicted embodiment, connecting arms 2606 form a linkage between drive wheels 2608, 2610, sensors 2612, and the linear actuator 2604, where geared ends for pairs of connecting arms 2606 meet and mesh at drive wheels 2608, 2610, and above drive wheels 2608, 2610, and where middle portions of connecting arms 2606 are pivotally coupled to middle portions of other connecting arms 2606 at intersection points between drive wheels 2608, 2610.

The linear actuator 2604, in some embodiments, is part of the retention mechanism for the pipe crawler 2600, and controls positioning of the drive wheels 2608, 2610, via the connecting arms 2606. In the depicted embodiment, two connecting arms 2606 are pivotally coupled to fixed points of the linear actuator 2604 (e.g. depicted toward the bottom of the linear actuator 2604 in FIG. 26. Another two connecting arms 2606 are pivotally coupled to movable points of the linear actuator 2604 (e.g. depicted toward the top of the linear actuator 2604 in FIG. 26). The linear actuator 2604, in other embodiments, is controlled or driven by a controller to move a nut, slide, or other movable portion including the movable points closer or further from the fixed points, to change the diameter of the pipe crawler 2600, as described below.

Figure 27:
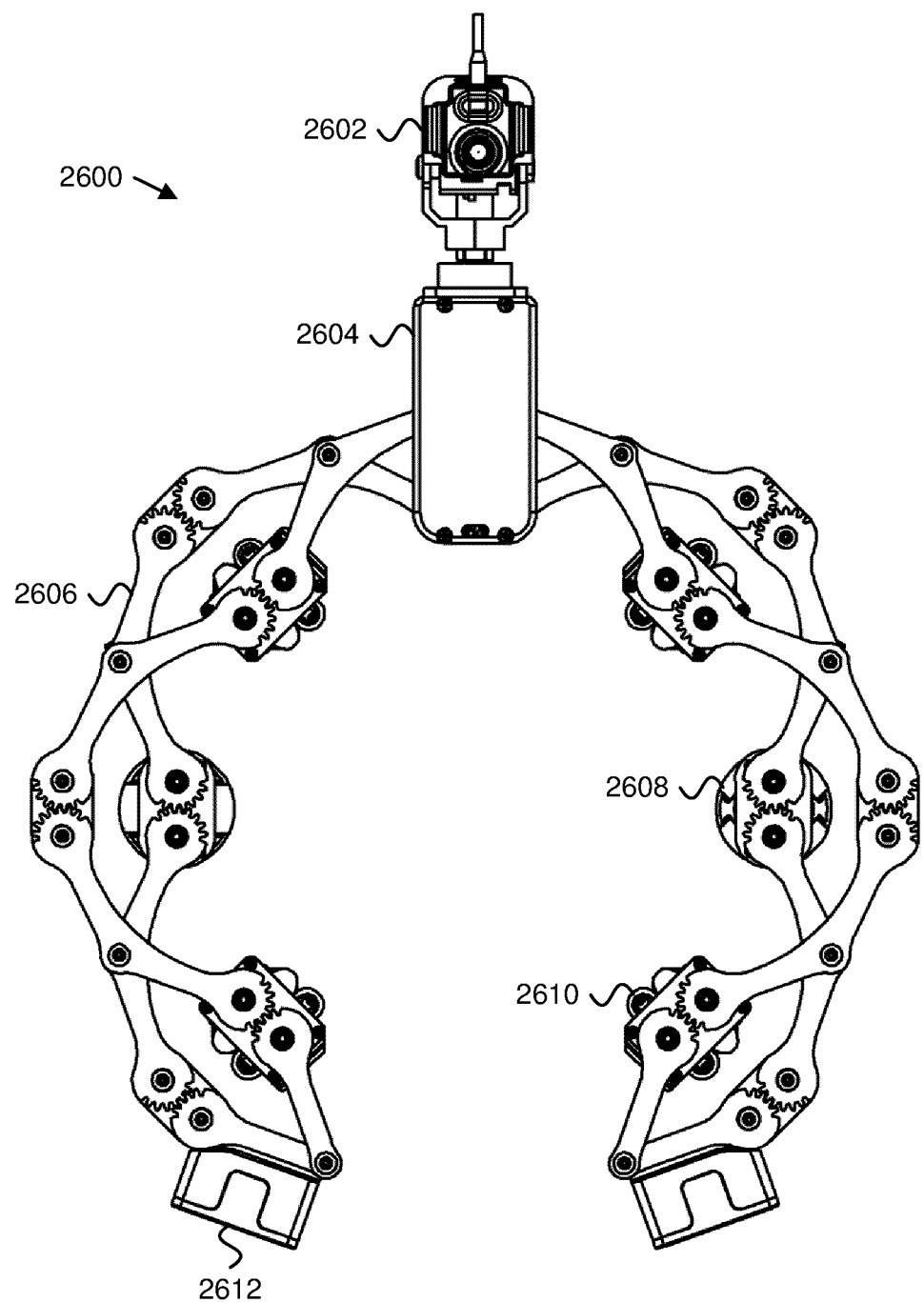
FIG. 27 is a side view illustrating the pipe crawler of FIG. 26, adjusted to a larger diameter.

FIG. 27 depicts the pipe crawler 2600 of FIG. 26, adjusted to a larger diameter. In the depicted embodiment, the linear actuator 2604 has moved the connecting arms 2606 that are coupled to an upper portion of the linear actuator 2604 closer to the connecting arms 2606 that are coupled to a lower portion of the linear actuator 2604, thus moving the drive wheels 2608, 2610 symmetrically further apart.

Figure 28:
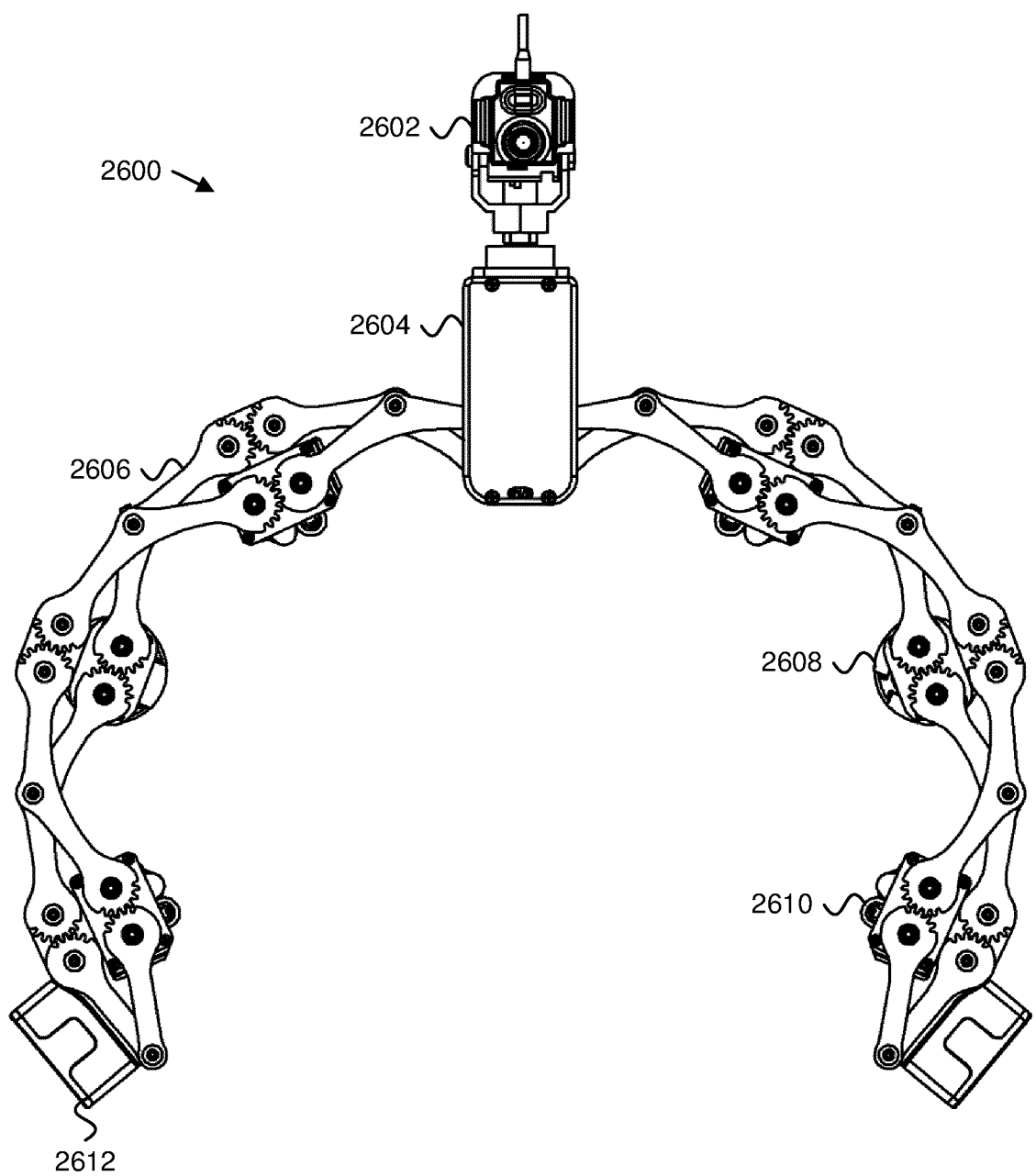
FIG. 28 is a side view illustrating the pipe crawler of FIG. 26, adjusted to a fully open position.

FIG. 28 depicts the pipe crawler 2600 of FIG. 26, adjusted to a fully open position. In the depicted embodiment, the linear actuator 2604 has moved the connecting arms 2606 that are coupled to the upper portion of the linear actuator 2604 still closer to the connecting arms 2606 that are coupled to the lower portion of the linear actuator 2604, thus moving two halves of the pipe crawler 2600 further apart. In the depicted embodiment, the left half of the pipe crawler 2600 and the right half are no longer positioned with the drive wheels 2608, 2610 a constant radius from a central axis of a pipe. Such a configuration, with two halves hinged to open as two separate arcs instead of as a single arc, may open the ends of the pipe crawler 2600 wide enough to admit a large diameter pipe, so that the pipe crawler 2600 can then be closed around the pipe (e.g., to the large diameter depicted in FIG. 27).

Figure 29:
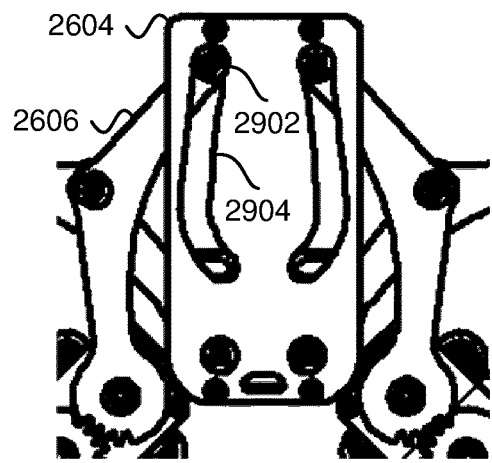
FIG. 29 is a side view illustrating one embodiment of a linear actuator for the pipe crawler of FIG. 26, in a first position.
Figure 30:
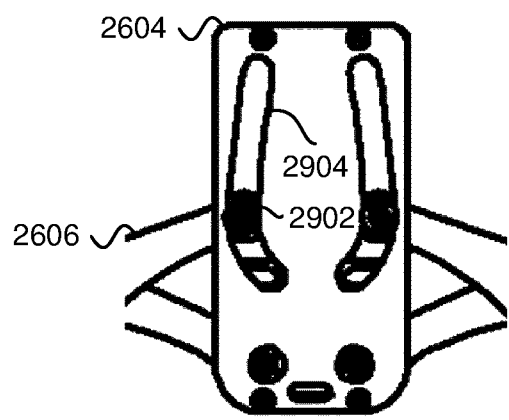
FIG. 30 is a side view illustrating the linear actuator of FIG. 29, in a second position.
Figure 31:
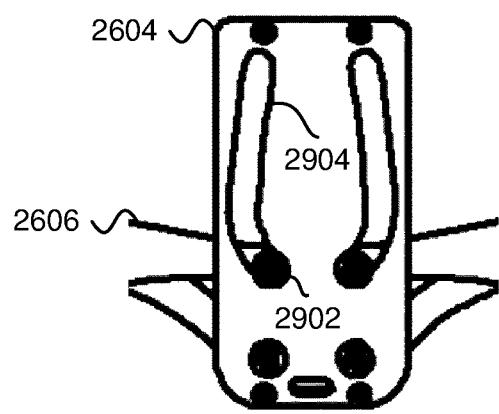
FIG. 31 is a side view illustrating the linear actuator of FIG. 29, in a third position.

FIGS. 29-31 depict the linear actuator 2604 for the pipe crawler 2600 of FIG. 26, in three positions corresponding to the positions of the pipe crawler 2600 in FIGS. 26-28, respectively. Pins 2902 coupled to the ends of connecting arms 2606 run in curved tracks 2904 in the body of the linear actuator 2604. In FIG. 29, the pins 2902 are at the tops of the tracks 2904, corresponding to a minimum-diameter position for the pipe crawler 2600. In FIG. 30, the pins 2902 are at the bottom of linear upper sections of the tracks 2904, corresponding to a minimum-diameter position for the pipe crawler 2600. Moving the pins 2902 along the linear upper sections of the tracks 2904, between the position of the pins 2902 in FIG. 29 and the position of the pins 2902 in FIG. 30, adjusts the diameter of the pipe crawler 2600 between a minimum and a maximum diameter. In FIG. 31, the pins 2902 are at the bottom of curved lower sections of the tracks 2904, corresponding to the fully-open position of the pipe crawler 2600 depicted in FIG. 28. Bringing the pins 2902 further down and closer together swings the two halves of the pipe crawler 2600 away from each other.

Figure 32:
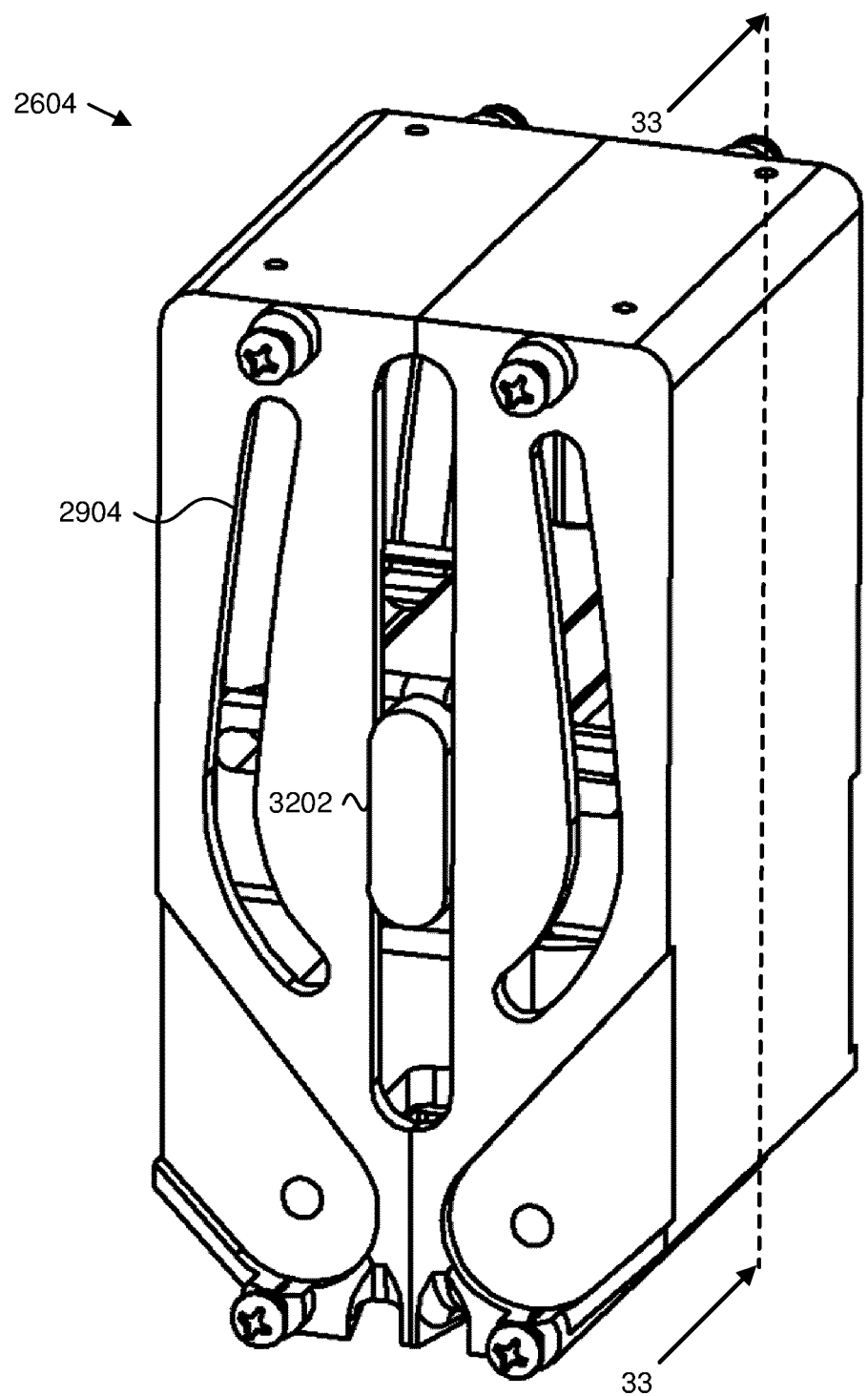
FIG. 32 is a perspective view further illustrating the linear actuator of FIG. 29.
Figure 33:
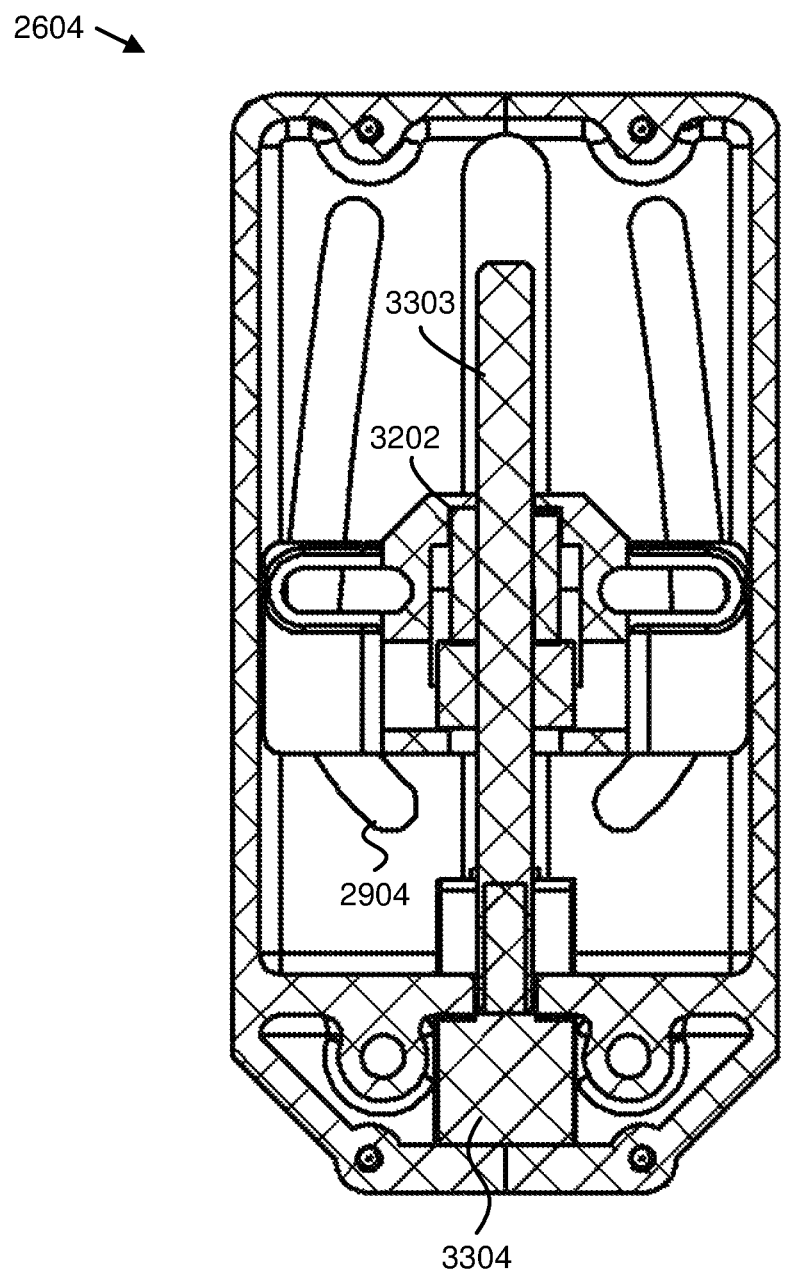
FIG. 33 is a cross section view further illustrating the linear actuator of FIG. 29.

FIGS. 32 and 33 further depict the linear actuator 2604, as described above. FIG. 32 depicts the linear actuator 2604 in a perspective view, and FIG. 33 depicts the linear actuator 2604 in a cross-section view taken in the direction indicated by arrows in FIG. 32. In the depicted embodiment, the linear actuator 2606 includes a nut 3202, a screw 3303, and a motor 3304, which are described below.

In the depicted embodiment, the motor 3304 may be an electrical motor such as a servo, a stepper motor, or the like, and, in some embodiments, is controlled by a controller, which may be substantially as described above. The motor, in some embodiments, drives a screw 3303, which may be a threaded rod, engaging with a threaded opening in the nut 3202. Thus, rotational motion of the screw 3303, in some embodiments, is transformed to linear motion of the nut 3202. In the depicted embodiment, the nut 3202 includes a protrusion running along a linear track, as depicted in FIG. 32. Additionally, the nut 3202 may include portions that extend horizontally away from the screw 3303 to engage the pins 2902. A controller turns the motor 3304, to turn the screw 3303, to move the nut 3202 up or down within the linear actuator 2604, to move the pins 2902 along the tracks 2904, thus adjusting the diameter of the pipe crawler 2600, or bringing the pipe crawler 2600 into or out of the fully open position. Various other or further types of linear actuators 2604 for moving connecting arms 2602 will be clear in view of this disclosure.

Figure 34:
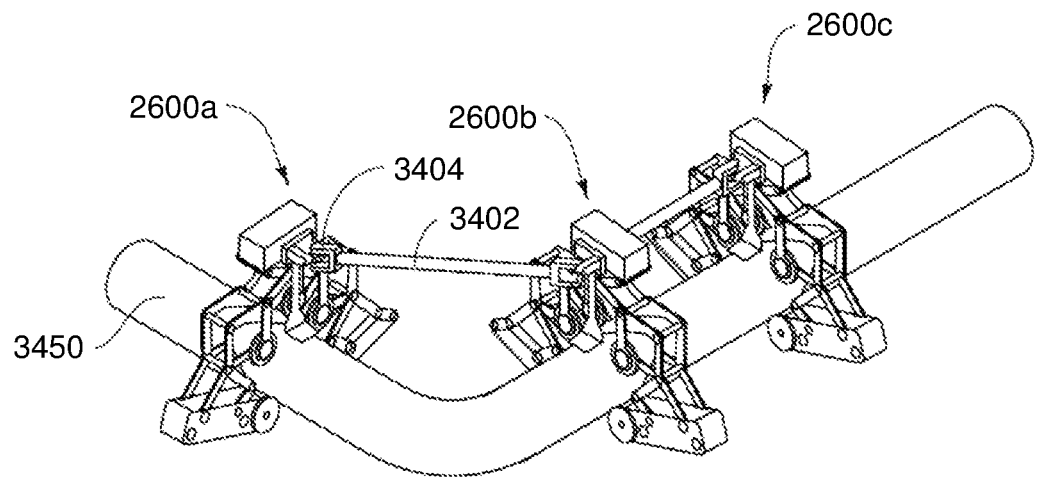
FIG. 34 is a perspective view illustrating one embodiment of multiple coupled pipe crawlers traversing a bending pipe.
Figure 35:
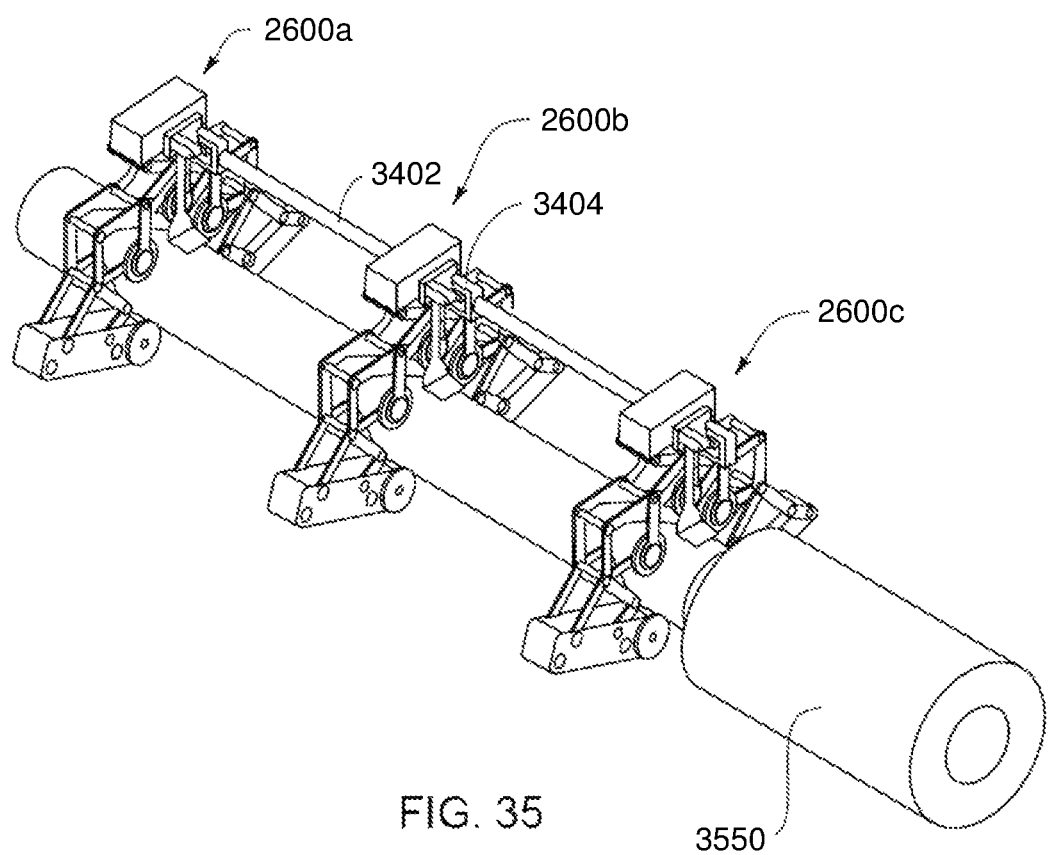
FIG. 35 is a perspective view illustrating one embodiment of multiple coupled pipe crawlers traversing a pipe that changes diameter.

FIGS. 34 and 35 depict multiple coupled pipe crawlers 2600. Pipe crawlers 2600a-c are, in some embodiments, substantially similar to the pipe crawler 2600 of FIG. 26, and may be coupled together by shafts 3402 and universal joints 3404. In FIG. 34, the pipe crawlers 2600 are traversing a bending pipe 3450. As one pipe crawler 2600a goes around a bend in a pipe 3450, while the other pipe crawlers 2600b-c have not yet gone around the same bend, universal joints 3404 allow the pipe crawlers 2600a-c to be oriented differently, while shafts 3402 maintain a distance between pipe crawlers 2600, so that pipe crawler 2600a does not collide with pipe crawler 2600c.

In FIG. 35, the pipe crawlers 2600 are traversing a pipe 3550 that changes diameter. Two pipe crawlers 2600a-b, in some embodiments, are controlled to press drive wheels against the pipe 3550, while another pipe crawler 2600c has one or more drive wheels away from the pipe 3550 to adjust diameter. In some examples, the pipe crawler 2600c adjusts to a larger diameter, then the pipe crawlers 2600a-c moves so that pipe crawler 2600c is on the larger-diameter portion of the pipe 3550. Afterward, pipe crawler 2600b adjusts to the larger diameter, and the pipe crawlers 2600a-c move again so that pipe crawler 2600b is also on the larger-diameter portion of the pipe 3550. Pipe crawler 2600a, in some embodiments, then adjust to the larger diameter so that all the pipe crawlers 2600 can traverse the larger-diameter portion of the pipe 3550. The same sequence, in some embodiments, occurs in reverse to move the pipe crawlers 2600 from the larger-diameter portion of the pipe 3550 to the smaller-diameter portion.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a pipe crawler, the pipe crawler comprising:
one or more drive wheels capable of moving along and around a pipe;
one or more instruments coupled to the one or more drive wheels, an instrument comprising one or more of a sensor instrument and a maintenance instrument;
a retention mechanism that retains the one or more drive wheels against an outer surface of the pipe, the retention mechanism providing adjustable positions for the one or more drive wheels for disposing the one or more drive wheels against the outer surface of the pipe; and
a controller that communicates with the one or more drive wheels to move the one or more drive wheels on the outer surface of the pipe, and that operates the one or more instruments;
a feeder tube that encloses the pipe crawler for delivering the pipe crawler to the pipe, wherein the retention mechanism deforms in the feeder tube such that the pipe crawler is retained in the feeder tube in a linear shape prior to emerging from the feeder tube.

2. The apparatus of claim 1, wherein the pipe crawler further comprises an obstacle sensor that detects obstacles along the pipe and communicates with the controller, wherein the controller controls the drive wheels to avoid the obstacles.

3. The apparatus of claim 1, wherein at least one of the one or more drive wheels comprises one or more of an omni wheel and a mecanum wheel.

4. The apparatus of claim 1, wherein the one or more drive wheels comprise a first omni wheel oriented for moving the pipe crawler along the pipe and a second omni wheel oriented for moving the pipe crawler around the pipe.

5. The apparatus of claim 1, wherein the one or more drive wheels comprise a pair of mecanum wheels that corotate to move the pipe crawler in a first direction and that counter-rotate to move the pipe crawler in a second direction.

6. The apparatus of claim 1, wherein the length of the pipe crawler is less than a full circumference of the pipe and the retention mechanism retains the pipe crawler in an open ring shape on the outer surface of the pipe.

7. The apparatus of claim 1, wherein the retention mechanism comprises a set of couplings that connect adjacent drive wheels, the couplings applying one or more of a spring force and a motor force to retain the drive wheels against the outer surface of the pipe.

8. The apparatus of claim 1, wherein the retention mechanism comprises a solid open ring and rods coupled to the drive wheels, the rods extending through openings in a body of the open ring, the rods movable within the openings for moving the drive wheels to contact the outer surface of the pipe, wherein the rods move within the openings for contacting a plurality of pipe contours.

9. The apparatus of claim 1, further comprising one or more brackets that extend from the pipe crawler to flexibly connect the pipe crawler to one or more of a second pipe crawler and a cable support.

10. The apparatus of claim 1, wherein the pipe crawler further comprises a cable and a plurality of cable supports, the cable coupled to the controller, a cable support comprising a connector that couples the cable to the cable support, the connector slidably coupled to the pipe to allow the cable support to move along the pipe.

11. The apparatus of claim 1, wherein the pipe crawler further comprises one or more of a battery, a light source, a radio transmitter, a radio receiver, a cable connection port, a power switch, and one or more motors that operate the one or more drive wheels.

12. The apparatus of claim 1, wherein the sensor instrument inspects a condition of the pipe.

13. The apparatus of claim 12, wherein the sensor instrument comprises one or more of a camera, a video camera, an x-ray sensor, a pipe thickness sensor, an ultrasound sensor, an eddy current sensor, and a magnetic sensor.

14. The apparatus of claim 1, wherein the maintenance instrument performs operations affecting a condition of the pipe.

15. The apparatus of claim 14, wherein the maintenance instrument comprises one or more of a welder, a cutter, a grinder, a wire brush, a machining tool, an ultrasonic impact hardener and an applicator for one or more of a protective coating and thermal insulation.

16. The apparatus of claim 1, further comprising a drone for delivering the pipe crawler to the pipe.

17. The apparatus of claim 1, wherein the retention mechanism comprises a plurality of servos that position the one or more drive wheels against the outer surface of the pipe.

18. The apparatus of claim 1, wherein the retention mechanism further comprises a linear actuator that controls positioning of the one or more drive wheels.

19. A pipe crawler comprising:
one or more drive wheels capable of moving along and around a pipe, wherein at least one of the one or more drive wheels comprises one or more of an omni wheel and a mecanum wheel;
one or more instruments coupled to the one or more drive wheels, an instrument comprising one or more of a sensor instrument and a maintenance instrument, wherein the sensor instrument inspects a condition of the pipe;
a retention mechanism that retains the one or more drive wheels against an outer surface of the pipe, the retention mechanism providing adjustable positions for the one or more drive wheels for disposing the one or more drive wheels against the outer surface of the pipe, wherein the retention mechanism comprises one or more of:
a set of couplings that connect adjacent drive wheels, the couplings applying one or more of a spring force and a motor force to retain the drive wheels against the outer surface of the pipe; and
a solid open ring and rods coupled to the drive wheels, the rods extending through openings in a body of the open ring, the rods movable within the openings for moving the drive wheels to contact the outer surface of the pipe, wherein the rods move within the openings for contacting a plurality of pipe contours;
a controller that communicates with the one or more drive wheels to move the one or more drive wheels on the outer surface of the pipe, and that operates the one or more instruments;
an obstacle sensor that detects obstacles along the pipe and communicates with the controller, wherein the controller controls the drive wheels to avoid the obstacles, wherein the length of the pipe crawler is less than a full circumference of the pipe and the retention mechanism retains the pipe crawler in an open ring shape on the outer surface of the pipe;
a feeder tube that encloses the pipe crawler for delivering the pipe crawler to the pipe, wherein the retention mechanism deforms in the feeder tube such that the pipe crawler is retained in the feeder tube in a linear shape prior to emerging from the feeder tube.

* * * * *